US012489235B2

(12) United States Patent
Manba et al.

(10) Patent No.: US 12,489,235 B2
(45) Date of Patent: Dec. 2, 2025

(54) CONNECTOR AND ELECTRONIC DEVICE

(71) Applicant: KYOCERA CORPORATION, Kyoto (JP)

(72) Inventors: Yousuke Manba, Yokohama (JP); Yoshiharu Fujii, Saitama (JP); Nobuyuki Nakajima, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 338 days.

(21) Appl. No.: 18/272,068

(22) PCT Filed: Jan. 12, 2022

(86) PCT No.: PCT/JP2022/000767
§ 371 (c)(1),
(2) Date: Jul. 12, 2023

(87) PCT Pub. No.: WO2022/158355
PCT Pub. Date: Jul. 28, 2022

(65) Prior Publication Data

US 2024/0072471 A1 Feb. 29, 2024

(30) Foreign Application Priority Data

Jan. 21, 2021 (JP) ................................ 2021-008296

(51) Int. Cl.
*H01R 12/79* (2011.01)
*H01R 12/88* (2011.01)
*H01R 12/77* (2011.01)

(52) U.S. Cl.
CPC ............ *H01R 12/79* (2013.01); *H01R 12/88* (2013.01); *H01R 12/774* (2013.01)

(58) Field of Classification Search
CPC ....... H01R 12/79; H01R 12/88; H01R 12/774
(Continued)

(56) References Cited

U.S. PATENT DOCUMENTS 3,932,018 A * 1/1976 Parsons ................. H01R 12/67 439/422
7,303,429 B2 * 12/2007 Kim ...................... H01R 12/79 439/495
(Continued)

FOREIGN PATENT DOCUMENTS

JP H11251010 A 9/1999
JP 2000299150 A 10/2000
(Continued)

*Primary Examiner* — Harshad C Patel
(74) *Attorney, Agent, or Firm* — Duane Morris LLP

(57) ABSTRACT

A connector (10), into and from which a connection object (70) is insertable and removable, includes an insulator (20) including an insertion portion (23) in which a connection object (70) can be inserted and a first contact (30) mounted on the insulator (20). The first contact (30) includes a contact piece (34) and a resiliently deformable resilient portion (33). The contact piece (34) includes a contact portion (35) configured to be connected to a signal line (73) of the connection object (70) in a fully inserted state where the connection object (70) is fully inserted in the insertion portion (23) and a removing portion (36) located closer to an insertion opening (23*a*) of the insertion portion (23) than the contact portion (35). The removing portion (36) is configured to be connected to the signal line (73) in a partially inserted state where the connection object (70) is partially inserted in the insertion portion (23). The removing portion (36) is configured to be apart from the connection object (70) when the resilient portion (33) is resiliently deformed in the fully inserted state.

12 Claims, 16 Drawing Sheets

(58) Field of Classification Search
USPC .......................................................... 439/260
See application file for complete search history.

(56) References Cited

U.S. PATENT DOCUMENTS

| | | | | |
|---|---|---|---|---|
| 7,445,495 B2 * | 11/2008 | Takashita | H01R 12/67 439/495 |
| 7,845,973 B2 | 12/2010 | Tida | |
| 9,859,639 B2 * | 1/2018 | Tagami | H01R 12/88 |
| 10,566,721 B2 | 2/2020 | Nakajima et al. | |
| 11,381,018 B2 | 7/2022 | Manba | |
| 11,888,249 B2 * | 1/2024 | Nakajima | H01R 12/77 |
| 2006/0178039 A1 * | 8/2006 | Chen | H01R 43/20 439/495 |
| 2010/0029128 A1 * | 2/2010 | Takahira | H01R 12/88 439/345 |
| 2017/0331206 A1 * | 11/2017 | Manba | H01R 12/774 |
| 2019/0044263 A1 * | 2/2019 | Manba | H01R 12/88 |

FOREIGN PATENT DOCUMENTS

| | | | |
|---|---|---|---|
| JP | 2002141126 | A | 5/2002 |
| JP | 3435600 | B2 | 8/2003 |
| JP | 2004022248 | A | 1/2004 |
| JP | 5203046 | B2 | 6/2013 |
| JP | 2016062851 | A | 4/2016 |
| JP | 2018181798 | A | 11/2018 |
| JP | 2019087308 | A | 6/2019 |
| KR | 20110106592 | A | 9/2011 |
| KR | 20170033521 | A | 3/2017 |

* cited by examiner

CONNECTOR AND ELECTRONIC DEVICE

CROSS-REFERENCE TO RELATED APPLICATIONS

The present application claims priority to Japanese Patent Application No. 2021-008296, filed on Jan. 21, 2021, which is hereby incorporated by reference herein in its entirety.

TECHNICAL FIELD

The present disclosure relates to a connector and an electronic device.

BACKGROUND OF INVENTION

Known electronic devices use connection objects including a flexible flat cable (FFC) and a flexible printed circuit board (FPC) and connectors connected to such connection objects. Examples of such a known electronic device include factory automation (FA) equipment, office automation (OA) equipment, and information processing terminals including a smartphone.

For example, Patent Literature 1 discloses a connector that is to be used for a known electronic device and that, in particular, exhibits improved connection stability and achieves a reduction in profile, and also discloses the structure of a contact for the connector.

Electronic devices including industrial equipment and on-vehicle equipment have tended to use connection objects including an FFC and an FPC instead of heavy electric wires in terms of weight reduction.

CITATION LIST

Patent Literature

Patent Literature 1: Japanese Patent No. 5203046

SUMMARY

In an embodiment of the present disclosure, a connector into and from which a connection object is insertable and removable includes an insulator including an insertion portion into which a connection object is inserted and a contact mounted on the insulator. The contact includes a contact piece and a resiliently deformable resilient portion. The contact piece includes a contact portion configured to contact a signal line of the connection object in a fully inserted state where the connection object is held in the insertion portion and a removing portion located closer to an insertion opening of the insertion portion than the contact portion. The removing portion is configured to contact the signal line in a partially inserted state where the connection object is inserted into the insertion portion and be apart from the connection object when the resilient portion is resiliently deformed in the fully inserted state.

In an embodiment of the present disclosure, an electronic device includes the above-described connector.

DESCRIPTION OF EMBODIMENTS

Electronic devices including industrial equipment and on-vehicle equipment require more reliability than related-art electronic devices. For example, during assembly, foreign matter, such as dirt or dust, on a connection object may reduce reliability. In such an electronic device, therefore, it is necessary to remove foreign matter on a connection object, even by a little, from the connection object when the connection object is connected to a connector. On the other hand, the speed of signal transmission has been markedly increased in recent electronic devices. Connectors to be connected to a connection object are required to be designed for higher speed transmission. The connector disclosed in Patent Literature 1 is not intended for electronic devices including industrial equipment and on-vehicle equipment, and is not designed with adequate consideration of compatibility between a structure for improvement of reliability and a structure for improvement of signal transmission characteristics.

In embodiments of the present disclosure, a connector and an electronic device achieve the compatibility between improvement of reliability and improvement of signal transmission characteristics.

An embodiment of the present disclosure will be described in detail below with reference to the accompanying drawings. In the following description, front-rear, left-right, and up-down directions are based on directions of arrows in the figures. The directions of the arrows in different figures agree with each other. For simplification of illustration, a circuit board CB, which will be described later, is not illustrated in some of the figures.

Figure 1:
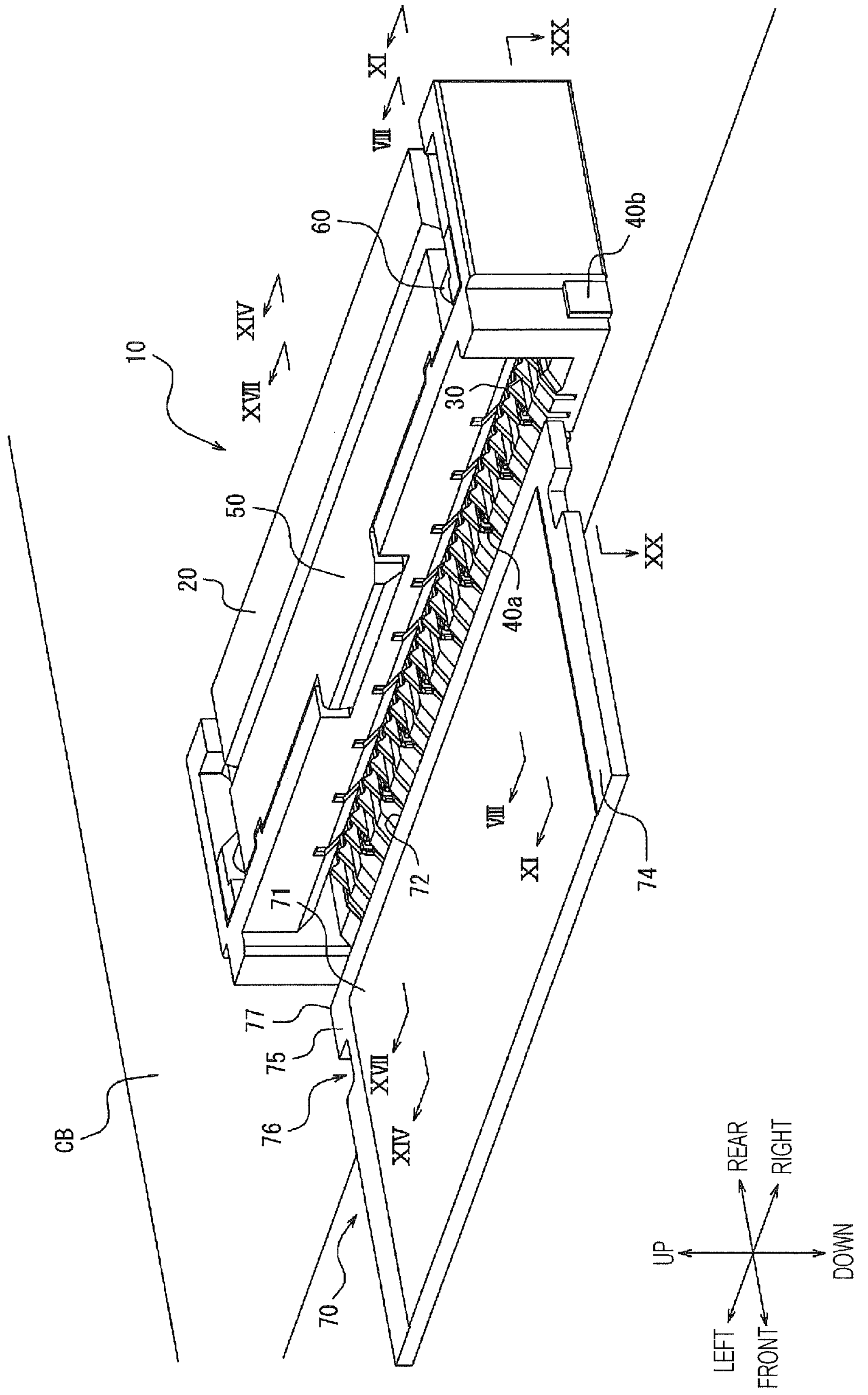
FIG. 1 is a downward perspective view of a connector according to an embodiment and a connection object in a non-insertion state.
Figure 2:
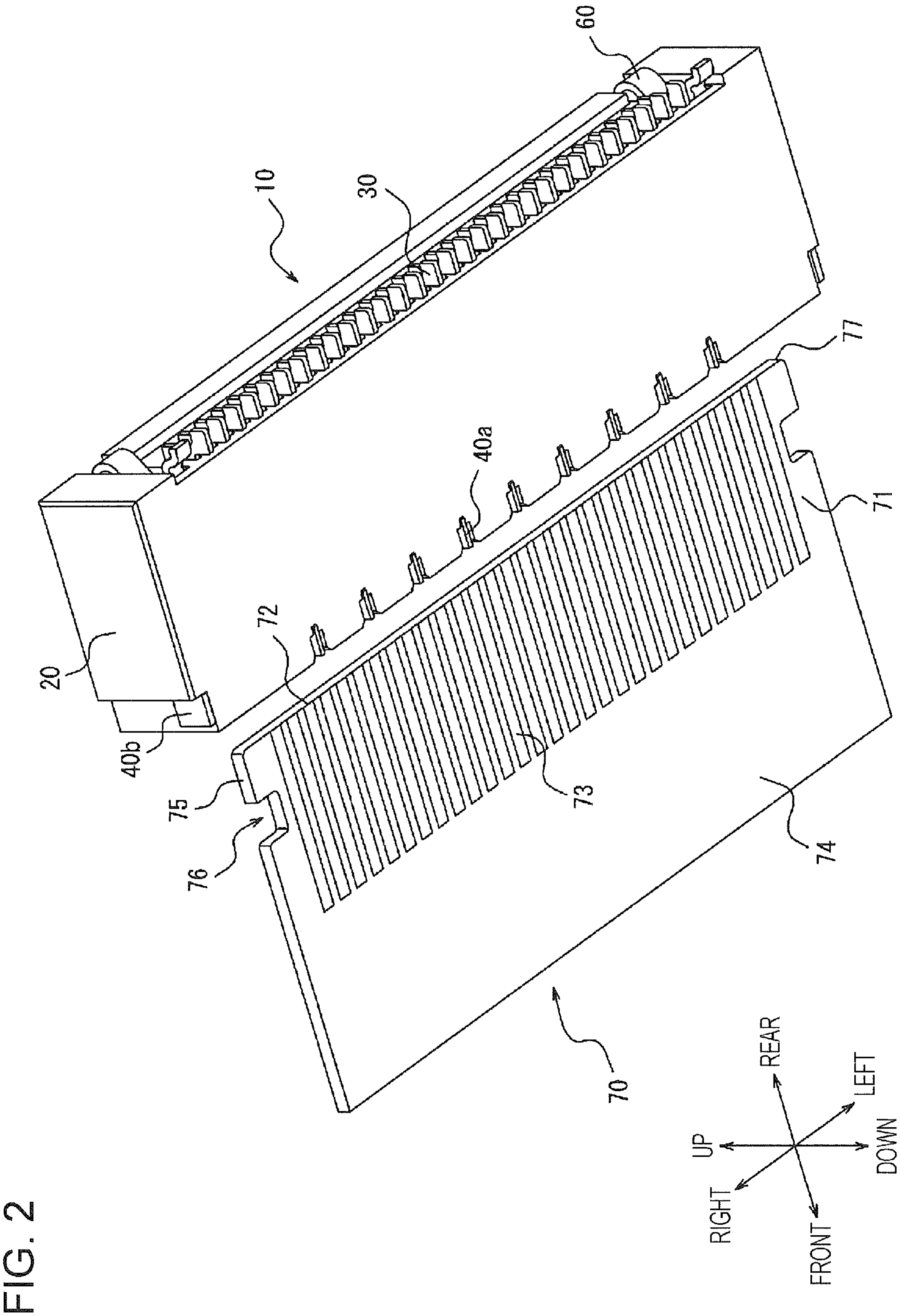
FIG. 2 is an upward perspective view of the connector and the connection object in FIG. 1.
Figure 3:
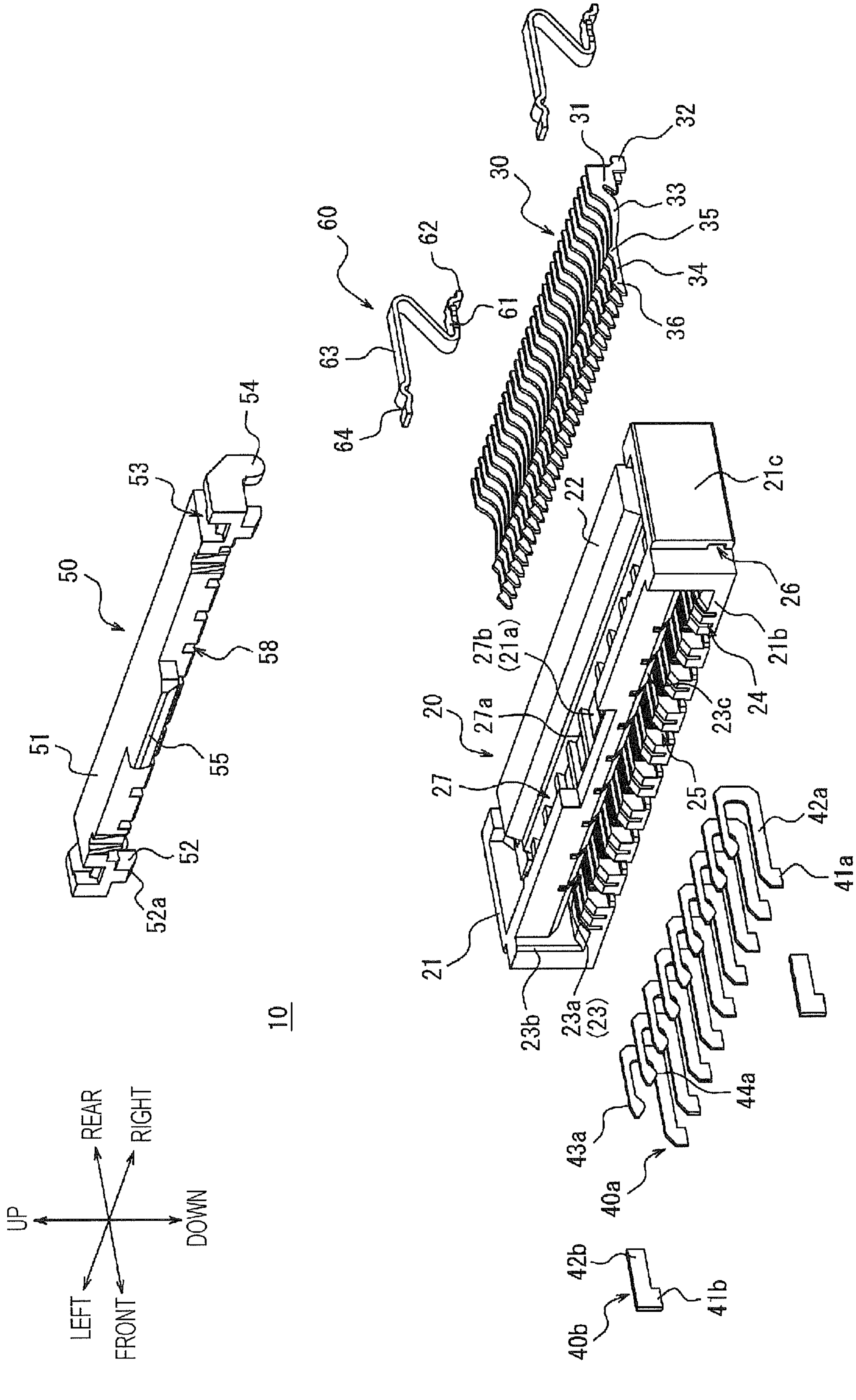
FIG. 3 is an exploded perspective view of the connector in FIG. 1.
Figure 4:
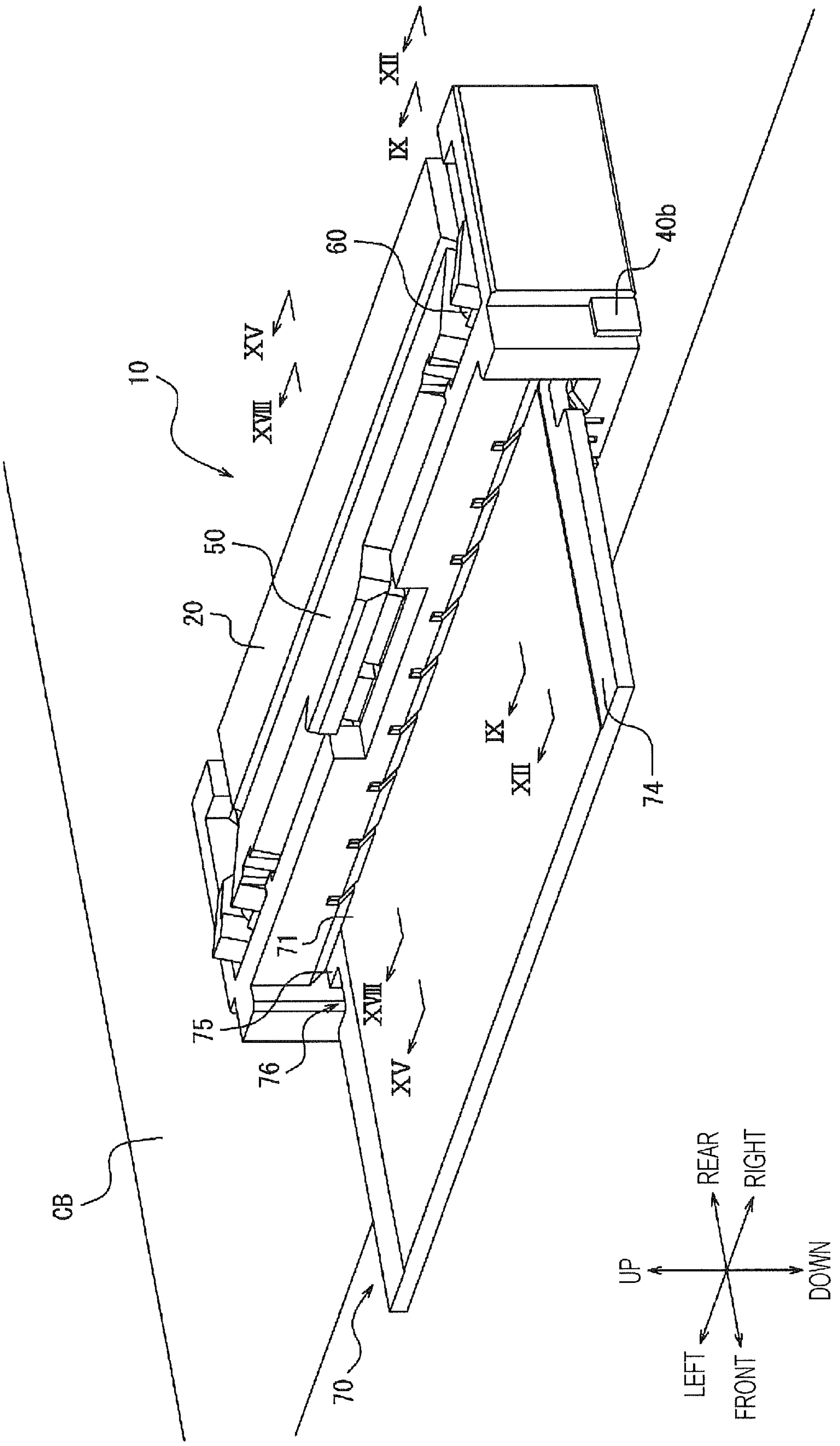
FIG. 4 is a downward perspective view of the connector according to the embodiment with the connection object in a partially inserted state.
Figure 5:
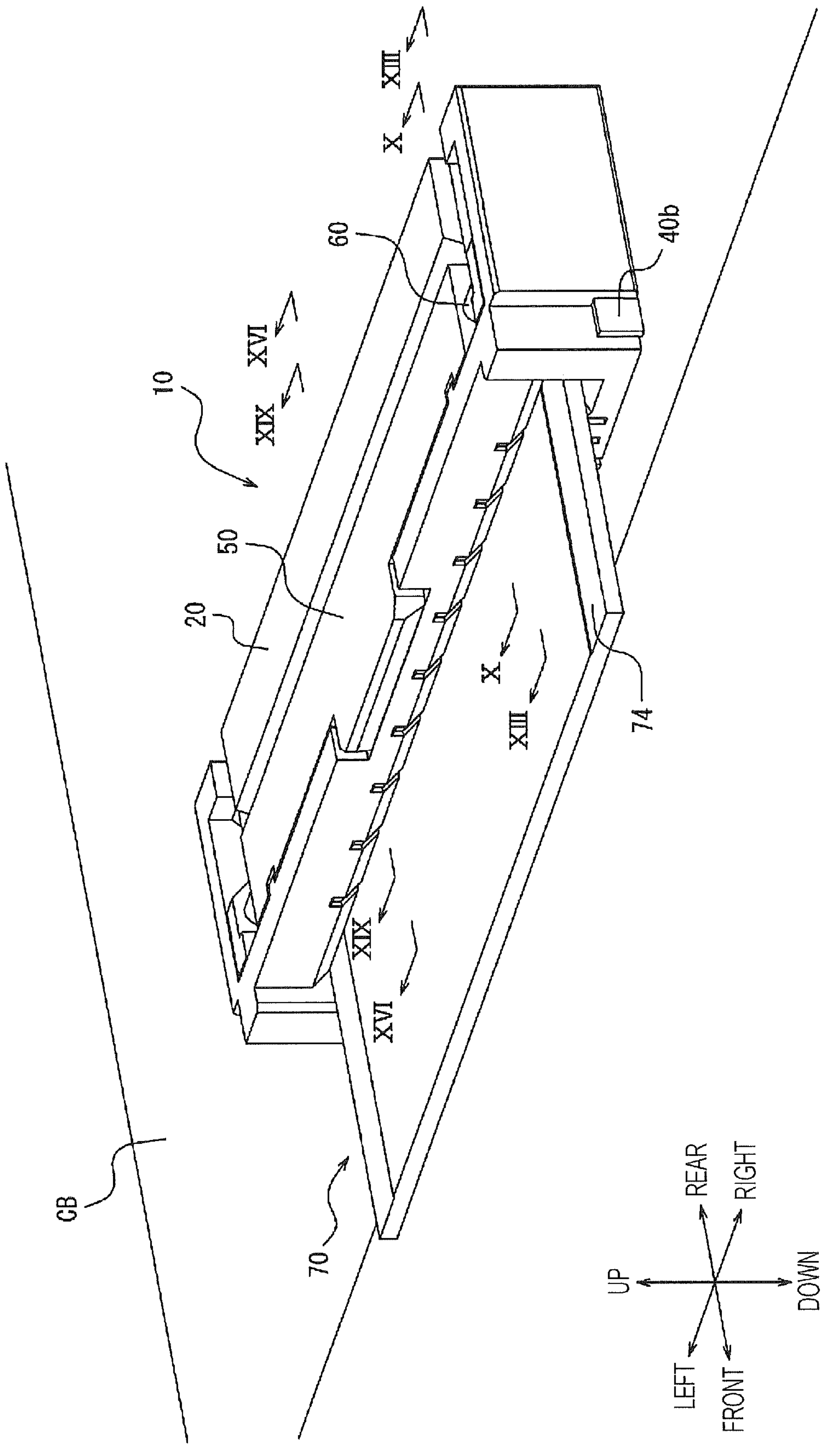
FIG. 5 is a downward perspective view of the connector according to the embodiment with the connection object in a fully inserted state.

FIG. 1 is a downward perspective view of a connector 10 according to an embodiment and a connection object 70 in a non-insertion state. FIG. 2 is an upward perspective view of the connector 10 and the connection object 70 in FIG. 1. FIG. 3 is an exploded perspective view of the connector 10 in FIG. 1. FIG. 4 is a downward perspective view of the connector 10 according to the embodiment with the connection object 70 in a partially inserted state. FIG. 5 is a downward perspective view of the connector 10 according to the embodiment with the connection object 70 in a fully inserted state. The configuration of the connector 10 according to the embodiment and the configuration of the connection object 70 will be mainly described with reference to FIGS. 1 to 5.

As illustrated in FIG. 3, the connector 10 includes an insulator 20, a first contact 30, a second contact 40*a*, a fitting 40*b*, an actuator 50, and a pressing member 60. The first contact 30, the second contact 40*a*, the fitting 40*b*, and the pressing member 60 are mounted on the insulator 20. The actuator 50 in a closed position is supported from below by the insulator 20 and the second contact 40*a* while a tip portion of the pressing member 60 is located on top of the actuator 50.

As used herein, the term "non-insertion state" refers to, for example, a state where the connection object 70 is not inserted into the connector 10. The non-insertion state includes a state where the first contact 30 of the connector 10 is not resiliently deformed. The term "partially inserted state" refers to, for example, a state where the connection object 70 is partially inserted into the connector 10. The partially inserted state includes a state where only a removing portion 36, which will be described later, of the first contact 30 is in contact with the connection object 70 and where the first contact 30 is resiliently defaulted. The term "fully inserted state" refers to, for example, a state where the connection object 70 is fully inserted in the connector 10. The fully inserted state includes a state where only a contact portion 35, which will be described later, of the first contact 30 is in contact with the connection object 70 and where the first contact 30 is resiliently deformed.

As used herein, the "closed position" includes a position of the actuator 50 closed relative to the insulator 20. The connector 10 holds the connection object 70 while the connector 10 and the connection object 70 are in the fully inserted state and the actuator 50 is in the closed position. An "open position" includes a position of the actuator 50 opened at a predetermined angle to the insulator 20. The actuator 50 is rotatable relative to the insulator 20 between, for example, the closed position and the open position.

As used herein, the Willi "insertion/removal direction" refers to, for example, the front-rear direction. The term "insertion direction" refers to, for example, a rearward direction. The term "direction in which the contact portion 35 protrudes" refers to, for example, an upward direction. The term "direction opposite to the direction in which the contact portion 35 protrudes" refers to, for example, a downward direction. The term "direction orthogonal to the direction in which the contact portion 35 protrudes and orthogonal to the insertion direction" refers to, for example, the left-right direction. In the connector 10 according to the embodiment, the direction orthogonal to the direction in which the contact portion 35 protrudes and orthogonal to the insertion direction corresponds to a thickness direction of the first contact 30. The term "removal side" refers to, for example, a front side. The term "insertion side" refers to, for example, a rear side. The term "insertion-opening-23*a* side" refers to, for example, the front side.

In the embodiment, the connector 10 is installed on the circuit board CB. The circuit board CB may be a rigid board or may be any other circuit board. The connector 10 causes the connection object 70 held in the connector 10 to be electrically connected to the circuit board CB via the first contact 30. The connector 10, into and from which the connection object 70 is insertable and removable, is connected to the connection object 70 in the fully inserted state.

In the following description, it is assumed that the connection object 70 is inserted into the connector 10 in a direction parallel to the circuit board CB, on which the connector 10 is installed. The connection object 70 is inserted into the connector 10 in, for example, the front-rear direction. The connection object 70 may be inserted into the connector 10 in any other direction. The connection object 70 may be inserted into the connector 10 in a direction orthogonal to the circuit board CB, on which the connector 10 is installed. The connection object 70 may be inserted into the connector 10 in the up-down direction.

The connection object 70 is, for example, a flexible flat cable (FFC). The connection object 70 is, however, not limited to this example. The connection object 70 may be any cable to be electrically connected to the circuit board CB with the connector 10. For example, the connection object 70 may be a flexible printed circuit board (FPC). The connection object 70 is not limited to the above-described cable, and may include any object. For example, the connection object 70 may include a rigid board or any other circuit board.

Referring to FIGS. 1 and 2, the connection object 70 includes an end portion 71. The end portion 71 is located on the insertion side of the connection object 70 and is to be held by the connector 10 in the fully inserted state. The end portion 71 of the connection object 70 includes an end face 72, which defines an edge of the connection object 70 that is located on the insertion side. The connection object 70 includes multiple signal lines 73 extending straight in the insertion/removal direction relative to the connector 10 and extending up to the end face 72. The connection object 70 includes an outer cover 74 covering the signal lines 73 on the removal side of the connection object 70. The signal lines 73 are covered by the outer cover 74 on the removal side of the connection object 70 and are exposed on a lower surface of the end portion 71.

The connection object 70 includes retainers 75, which are located on right and left or opposite sides of the end portion 71 on the insertion side. The connection object 70 includes lock recesses 76, which are next to the retainers 75 and are located on the removal side relative to the retainers 75. The lock recesses 76 are formed by cutting away parts of the right and left or opposite sides of the end portion 71. The connection object 70 includes guides 77, each of which is rounded and is located at a corner of the retainer 75 that is located on the insertion side.

With reference to FIG. 3, the connector 10 is assembled in the following manner, for example. The first contact 30 is pressed into the rear of the insulator 20. The second contact 40*a* and the fitting 40*b* are pressed into the front of the insulator 20. The actuator 50 is placed from above to the closed position relative to the insulator 20. While the actuator 50 is supported from below by the insulator 20 and the second contact 40*a*, the pressing member 60 is pressed into the rear of the insulator 20. At this time, the tip portion of the pressing member 60 is located on top of the actuator 50 supported by the insulator 20 and the second contact 40*a*.

Figure 6:
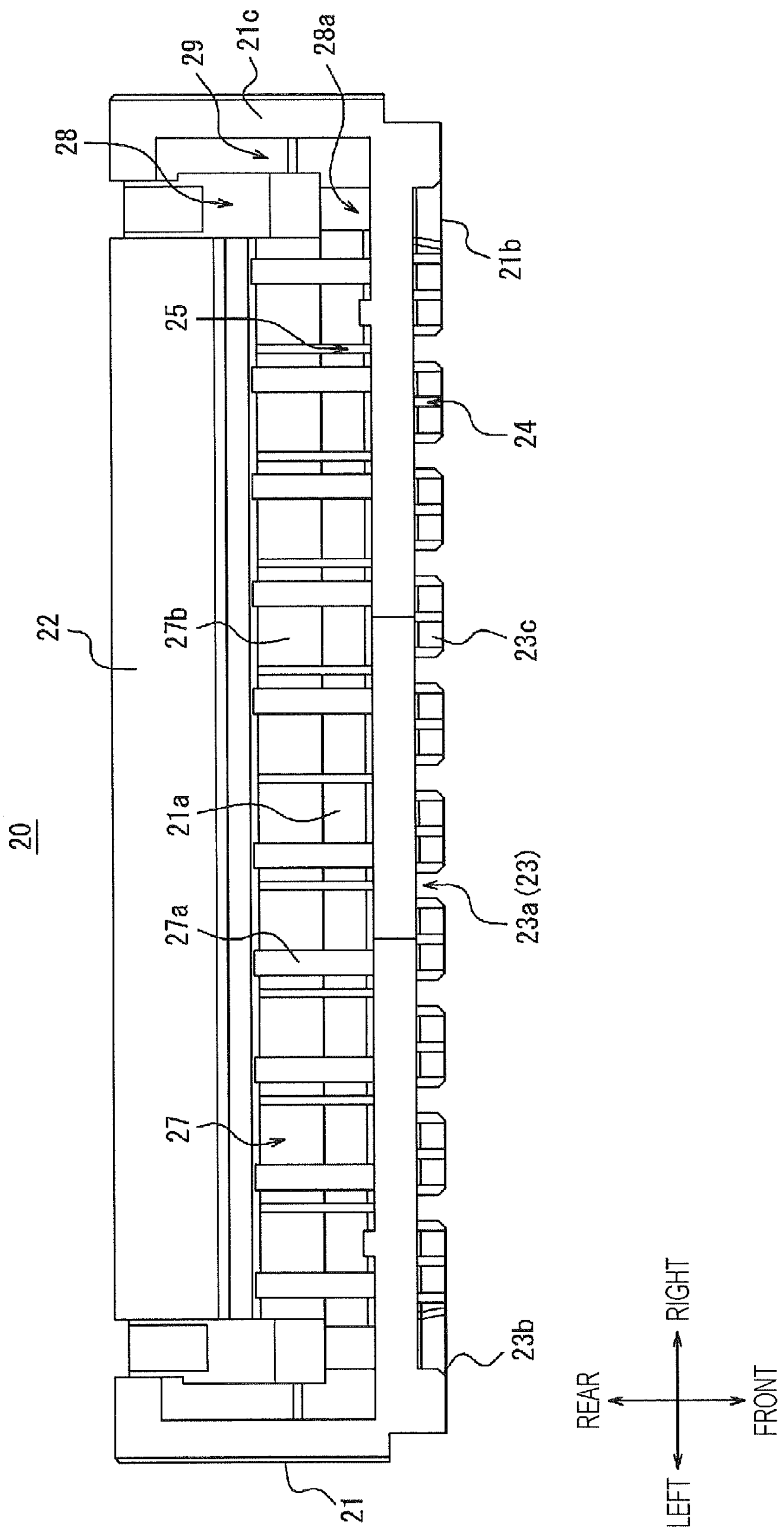
FIG. 6 is a top view of an insulator in FIG. 3.

FIG. 6 is a top view of the insulator 20 in FIG. 3. The configuration of the insulator 20 will now be mainly described with reference to FIGS. 3 and 6.

The insulator 20 is a bilaterally symmetrical box-shaped member made of an insulating heat-resistant synthetic resin material formed by injection molding. The shape of the insulator 20 is not limited to this example. The insulator 20 may have a bilaterally asymmetrical shape. The insulator 20 includes an outer peripheral wall 21. The outer peripheral wall 21 includes upper, lower, left, and right outer walls, or four outer walls. The outer peripheral wall 21 is rectangular in overall shape. The outer peripheral wall 21 includes a top wall 21*a*, a bottom wall 21*b*, and two side walls 21*c*. The insulator 20 includes a rear wall 22, which defines the rear of the insulator 20.

The insulator 20 includes an insertion portion 23 surrounded by the top wall 21*a*, the bottom wall 21*b*, the two side walls 21*c*, and the rear wall 22. The insulator 20 includes an insertion opening 23*a* of the insertion portion 23. The insertion opening 23*a* is an opening located at a front end of the insulator 20. The insulator 20 includes a first angled face 23*b*, which is located at a front end of the side wall 21*c*. The first angled face 23*b* is angled relative to the left-right direction and extends inward in the front-rear direction to the insertion portion 23. The insulator 20 includes a second angled face 23*c*, which is located at the front end of the insertion portion 23 and slopes inward in the up-down direction and inward in the front-rear direction. As illustrated in, for example, FIG. 17, which will be described later, the insertion portion 23 includes an inner face 23*d*, serving as a reference to position the end face 72 of the connection object 70 in the insertion direction in the fully inserted state.

The insulator 20 includes a first-contact mounting groove 24. The first-contact mounting groove 24 extends through the rear wall 22 and extends in an upper surface of the bottom wall 21*b* across the bottom wall 21*b* in the front-rear direction. The insulator 20 includes a second-contact mounting groove 25, which extends across the top wall 21*a* and the bottom wall 21*b* in the front-rear direction. The second-contact mounting groove 25, which extends in the front-rear direction, opens downward in a front end portion of the top wall 21*a* and extends through the top wall 21*a* in the up-down direction in a portion of the top wall 21*a* that is at the rear of the front end portion. The second-contact mounting groove 25 opens upward while extending across the bottom wall 21*b* in the front-rear direction.

Multiple first-contact mounting grooves 24 are arranged at predetermined intervals in the left-right direction. Multiple second-contact mounting grooves 25 are arranged at predetermined intervals in the left-right direction. An interval between two second-contact mounting grooves 25 that are adjacent to each other in the left-right direction is larger than that between two first-contact mounting grooves 24 that are adjacent to each other in the left-right direction. Each of the second-contact mounting grooves 25 is located between two first-contact mounting grooves 24 at opposite sides in the left-right direction.

The insulator 20 includes a fitting mounting groove 26, which is located in a lower portion of each of the side walls 21*c* and is recessed inward from a front end of the side wall 21*c*. The insulator 20 includes a mounting portion 27, which is recessed in the whole of the top wall 21*a* and in parts of the side walls 21*c*. The insulator 20 includes multiple ribs 27*a*, which are located in the mounting portion 27 and protrude upward from an outer surface of the top wall 21*a*. The ribs 27*a* extend in the front-rear direction on the outer surface of the top wall 21*a*. The insulator 20 includes a bottom 27*b* of the mounting portion 27. The bottom 27*b* is defined by a raised portion of the outer surface of the top wall 21*a* that is located on the rear side.

The insulator 20 includes a mounting groove 28, which is recessed and is located inside the side wall 21*c* in the left-right direction. The insulator 20 includes a through-hole 28*a*, which extends through the insulator 20 from a front part of the mounting groove 28 to the inside of the insertion portion 23 in the up-down direction. The insulator 20 includes a receiving portion 29, which is recessed in a central part of the side wall 21*c* in the left-right direction.

The first contact 30 is formed by shaping a sheet of, for example, a copper alloy containing, for example, phosphor bronze, beryllium copper, or titanium copper, and having spring resiliency or a Corson alloy into a form illustrated in FIG. 3 with a progressive die (stamping). The first contact 30 is formed only by stamping, for example. The method of forming the first contact 30 is not limited to this example. For example, the method may include, after stamping, bending a workpiece in the thickness direction. The first contact 30 is plated with nickel, serving as an undercoat layer, and is further plated with, for example, gold or tin, serving as a surface layer. The multiple first contacts 30 are arranged at predetermined intervals in the left-right direction.

Each of the first contacts 30 includes an engaging portion 31, which has relatively large dimensions in the up-down direction and the front-rear direction. The first contact 30 includes an installation portion 32, which extends obliquely downward from a lower end of the engaging portion 31 to the rear side. The first contact 30 includes a resiliently deformable resilient portion 33, which extends from an upper front end of the engaging portion 31. The resilient portion 33 extends forward from the upper front end of the engaging portion 31 while being curved or bent. The resilient portion 33 extends obliquely downward from the upper front end of the engaging portion 31 toward the insertion opening 23*a* located in front of the resilient portion 33, bends, and extends obliquely upward. The resilient portion 33 is resiliently deformable in the up-down direction.

The first contact 30 includes a contact piece 34 connecting to the resilient portion 33. The contact piece 34 extends from a front end of the resilient portion 33 toward the insertion opening 23*a* of the insertion portion 23 while being at an obtuse angle to the resilient portion 33. The contact piece 34 includes the contact portion 35 and the removing portion 36. The contact portion 35 is located adjacent to the resilient portion 33, protrudes upward, and has a mound-like shape. The removing portion 36 is located closer to the insertion opening 23*a* of the insertion portion 23 than the contact portion 35. The removing portion 36 is located at a front end of the contact piece 34, protrudes upward, and has a mound-like shape. The contact portion 35 and the removing portion 36 are spaced apart from each other at a predetermined distance in the front-rear direction. The contact piece 34 protrudes toward the insertion opening 23*a* while being angled relative to the resilient portion 33 in the direction opposite to the direction in which the contact portion 35 protrudes from the contact piece 34. The contact piece 34 may be resiliently deformable like the resilient portion 33.

Figure 17:
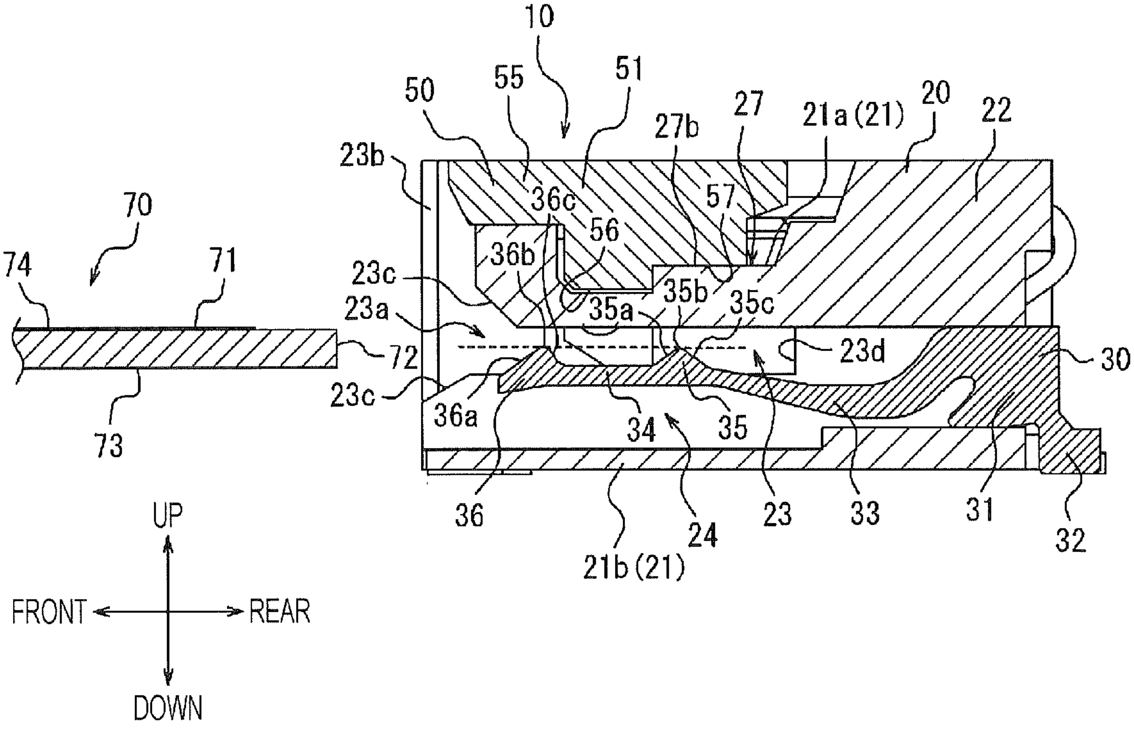
FIG. 17 is a cross-sectional view taken along arrow line XVII-XVII in FIG. 1.
Figure 19:
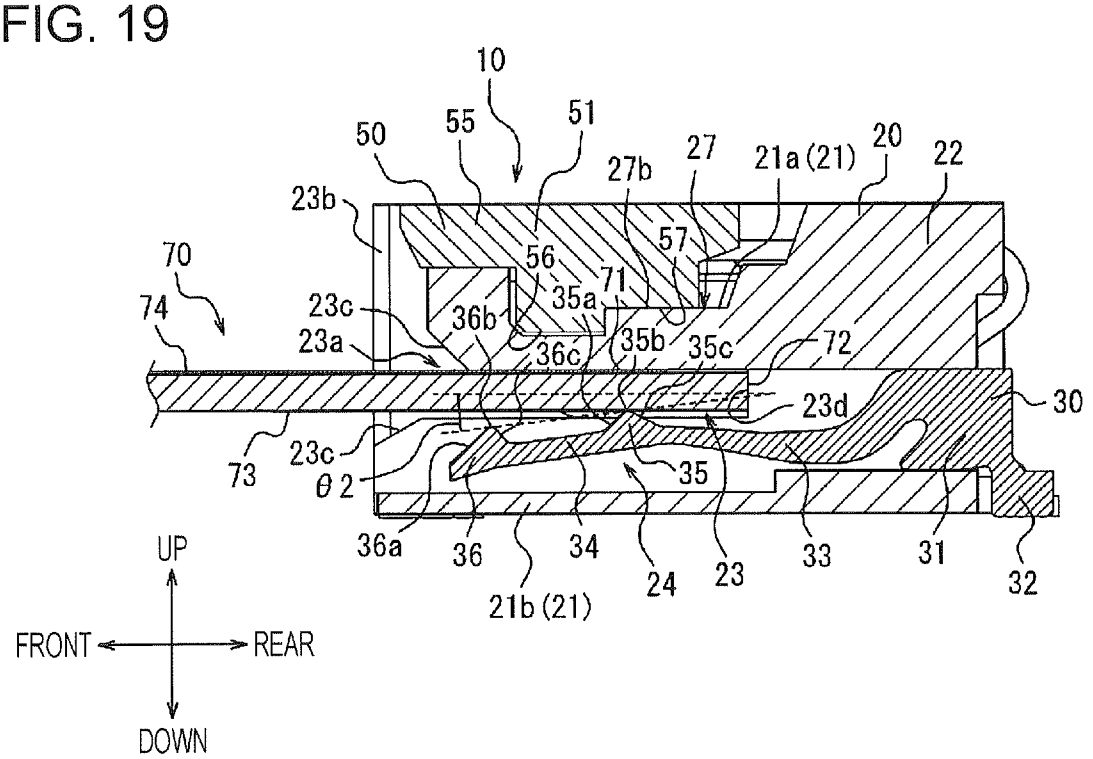
FIG. 19 is a cross-sectional view taken along arrow line XIX-XIX in FIG. 5.

As illustrated in FIGS. 17 and 19, which will be described later, the contact portion 35 includes a first sloped face 35*a*, which is located at a front side of the contact portion 35 and slopes obliquely upward and rearward. The contact portion 35 includes an apex part 35*b*, which connects to the first sloped face 35*a* and is rounded. The contact portion 35 includes a second sloped face 35*c*, which slopes obliquely downward from the apex part 35*b* and rearward. The removing portion 36 includes a first sloped face 36*a*, which is located at a front side of the removing portion 36 and slopes obliquely upward and rearward. The removing portion 36 includes an apex part 36*b*, which connects to the first sloped face 36*a* and is rounded. The removing portion 36 includes a second sloped face 36*c*, which slopes obliquely downward from the apex part 36*b* and rearward.

The second contact 40*a* is formed by shaping a sheet of any metal material into a form illustrated in FIG. 3 with a progressive die (stamping). The second contact 40*a* is formed only by stamping, for example. The method of forming the second contact 40*a* is not limited to this example. For example, the method may include, after stamping, bending a workpiece in the thickness direction. The multiple second contacts 40*a* are arranged at predetermined intervals in the left-right direction.

The second contact 40*a* includes an installation portion 41*a*, which defines a lower end of the second contact 40*a*. The second contact 40*a* includes a base portion 42*a*, which extends rearward from the installation portion 41*a* and is U-shaped. The second contact 40*a* includes a supporting face 43*a*, which is defined by an upper face of a tip part end of the base portion 42*a*. The second contact 40*a* includes a contact portion 44*a*, which is located at the tip part of the base portion 42*a*, protrudes downward, and has a mound-like shape.

The fitting 40*b* is formed by shaping a sheet of any metal material into a form illustrated in FIG. 3 with a progressive die (stamping). The fitting 40*b* is flat and L-shaped. The fitting 40*b* is formed only by stamping, for example. The method of forming the fitting 40*b* is not limited to this example. For example, the method may include, after stamping, bending a workpiece in the thickness direction. Two fittings 40*b* are respectively arranged on opposite ends of the connector 10 in the left-right direction.

Each of the fittings 40*b* includes an installation portion 41*b*, which defines a lower end of the fitting 40*b*. The fitting 40*b* includes an engaging portion 42*b*, which connects to the installation portion 41*b* and has relatively large dimensions in the up-down direction and the front-rear direction.

Figure 7:
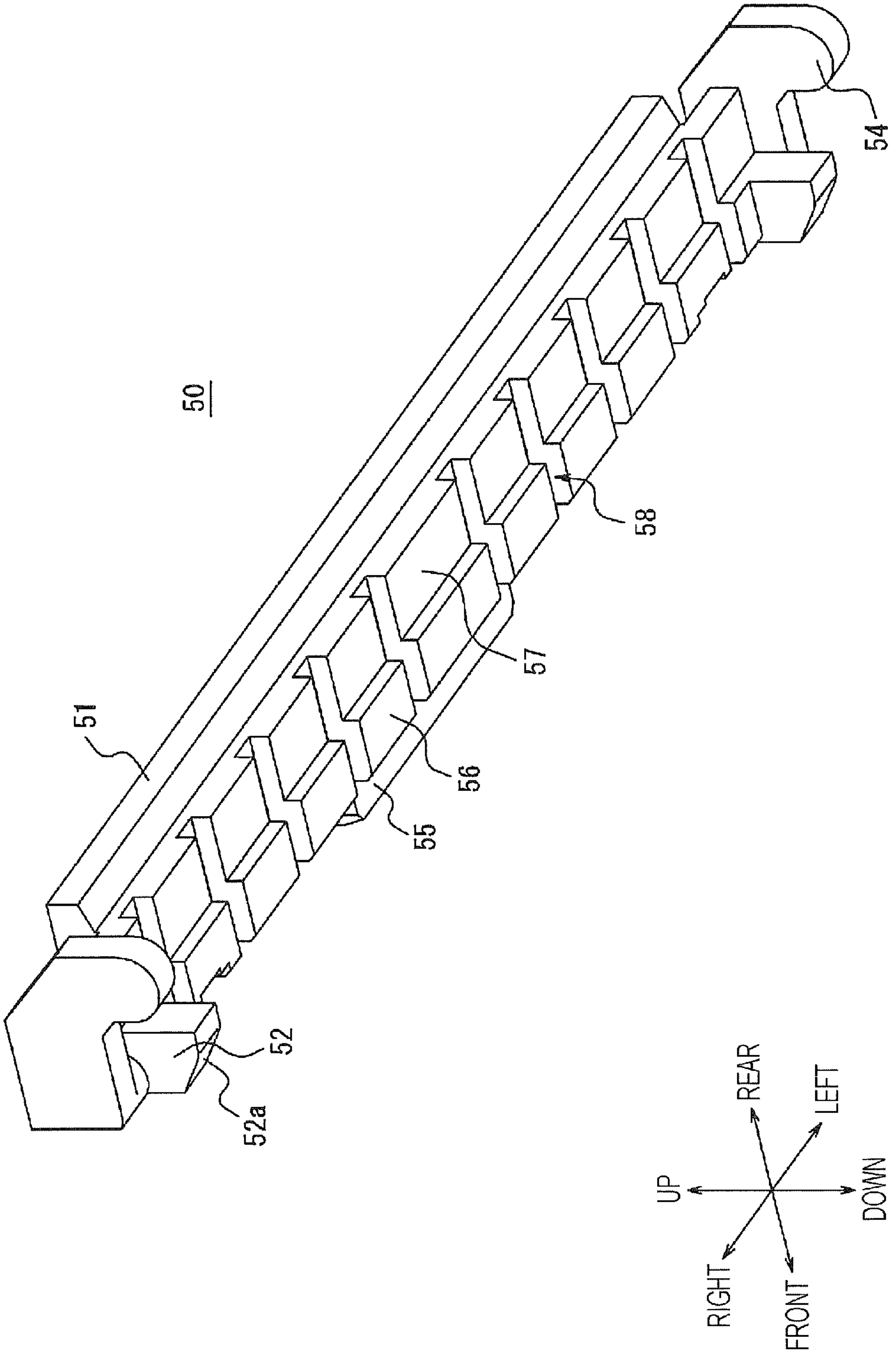
FIG. 7 is an upward perspective view of an actuator in FIG. 3.

FIG. 7 is an upward perspective view of the actuator 50 in FIG. 3. The configuration of the actuator 50 will now be mainly described with reference to FIGS. 3 and 7.

The actuator 50 is a bilaterally symmetrical plate-shaped member made of an insulating heat-resistant synthetic resin material formed by injection molding and extending in the left-right direction, as illustrated in FIGS. 3 and 7. The shape of the actuator 50 is not limited to this example. The actuator 50 may have a bilaterally asymmetrical shape. The actuator 50 includes a base portion 51 and two locking protrusions 52. The base portion 51 is plate-shaped and extends in the left-right direction. The locking protrusions 52 protrude obliquely downward from left and right or opposite sides of a front end part of the base portion 51. The locking protrusions 52 each include a sloped face 52*a*, which is located on a front lower part of the locking protrusion 52 and slopes obliquely downward and rearward. The actuator 50 includes a hollow 53, which is located directly above each of the locking protrusions 52 and is formed by cutting away a part of the base portion 51.

The actuator 50 includes pivots 54, which protrude downward from left and right or opposite sides of a rear end part of the base portion 51 and have a semicircular shape. The actuator 50 includes an operating portion 55, which is located at the middle of the front end part of the base portion 51 and protrudes forward. The actuator 50 includes a first support portion 56, which defines a lowermost face of a part of the base portion 51 that is located inside the two locking protrusions 52 in the left-right direction. The actuator 50 includes a second support portion 57, which defines a lower face located at the rear of the first support portion 56 and at a level higher than the first support portion 56. The actuator 50 includes multiple grooves 58 extending in the front-rear direction in the first support portion 56 and the second support portion 57.

The pressing member 60 is formed by shaping a sheet of any metal material into a form illustrated in FIG. 3 with a progressive die (stamping). The pressing member 60 is formed by, for example, bending a workpiece in the thickness direction after stamping, and is thus Z-shaped. The method of forming the pressing member 60 is not limited to this example. For example, the method may include only stamping. The two pressing members 60 are respectively arranged at the opposite ends of the connector 10 in the left-right direction.

The pressing member 60 includes an engaging portion 61, which is located in a lower part of the pressing member 60 and has a relatively large dimension in the left-right direction. The pressing member 60 includes an installation portion 62, which extends downward from a rear end of the engaging portion 61 while being bent. The pressing member 60 includes a base portion 63, which extends from a front end of the engaging portion 61 and is Z-shaped. The pressing member 60 includes a contact portion 64, which is located at a front end of the base portion 63 and is bent in a wave-like shape.

In the connector 10, the first contact 30 is mounted on the insulator 20. For example, the first contact 30 is mounted on the rear wall 22 such that the engaging portion 31 engages with the first-contact mounting groove 24 of the insulator 20. Similarly, the second contact 40*a* is mounted on the insulator 20 such that the base portion 42*a* engages with the second-contact mounting groove 25 of the insulator 20. The fitting 40*b* is mounted on the insulator 20 such that the engaging portion 42*b* engages with the fitting mounting groove 26 of the insulator 20. The pressing member 60 is mounted on the insulator 20 such that the engaging portion 61 engages with the mounting groove 28 of the insulator 20.

In the connector 10, the actuator 50 is disposed on the mounting portion 27 of the insulator 20. The actuator 50 in the closed position is supported from below by the insulator 20 and the second contact 40*a*. For example, the pivot 54 of the actuator 50 is held in the receiving portion 29 of the insulator 20 and is in contact with an inner face of the receiving portion 29. For example, the first support portion 56 of the actuator 50 is in contact with the supporting face 43*a* of the second contact 40*a* mounted on the insulator 20. The supporting face 43*a* is exposed in the mounting portion 27 through the second-contact mounting groove 25. For example, the second support portion 57 of the actuator 50 is in contact with the bottom 27*b* of the mounting portion 27 of the insulator 20. For example, the rib 27*a* of the insulator 20 fits in the groove 58 of the actuator 50.

In the connector 10, the actuator 50 is pressed from above by the pressing member 60 mounted on the insulator 20. For example, the contact portion 64 of the pressing member 60 is located in the hollow 53 of the actuator 50 and contacts, from above, a bottom of the hollow 53.

Referring to, for example, FIG. 1, the connector 10 is installed on a circuit formation surface, or an upper surface, of the circuit board CB disposed substantially parallel to the insertion/removal direction. More specifically, the installation portion 32 of the first contact 30 is placed on a soldering paste applied to a pattern on the circuit board CB. The installation portion 41*a* of the second contact 40*a* is placed on the soldering paste applied to the pattern on the circuit board CB. The installation portion 41*b* of the fitting 40*b* is placed on the soldering paste applied to the pattern on the circuit board CB. The installation portion 62 of the pressing member 60 is placed on the soldering paste applied to the pattern on the circuit board CB. The installation portion 32, the installation portion 41*a*, the installation portion 41*b*, and the installation portion 62 are soldered to the pattern by heating and melting the soldering paste in, for example, a reflow furnace. Thus, the installation of the connector 10 on the circuit board CB is completed. For example, an electronic component different from the connector 10, for example, a central processing unit (CPU), a controller, or a memory, is installed on the circuit formation surface of the circuit board CB.

Figure 8:
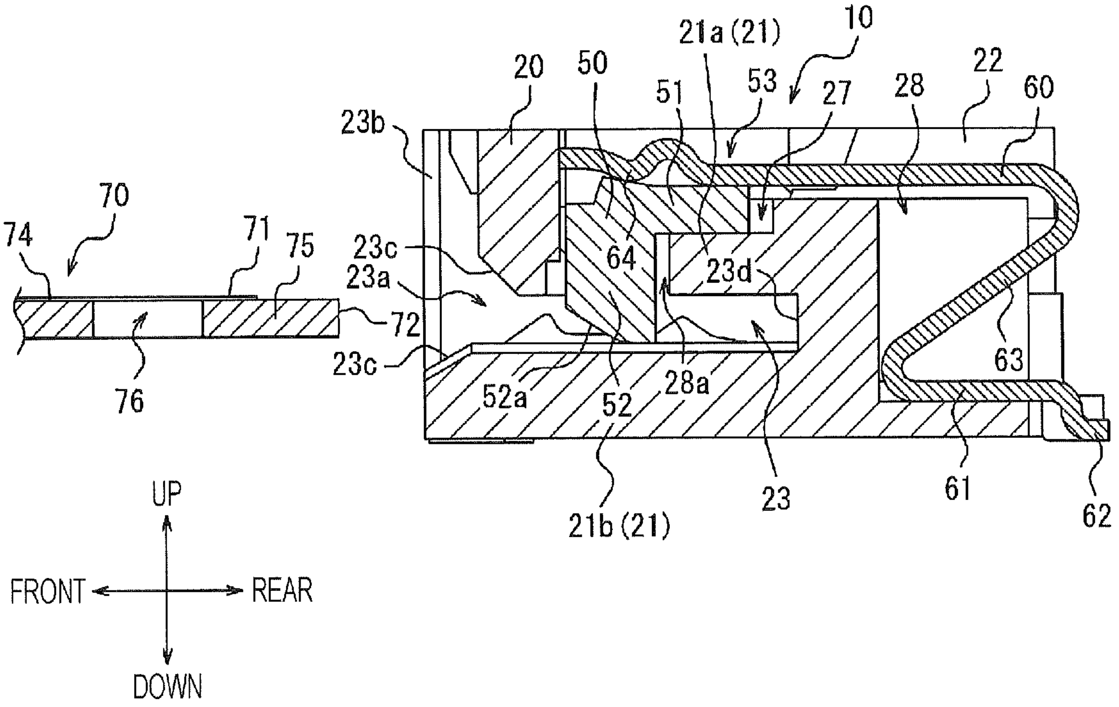
FIG. 8 is a cross-sectional view taken along arrow line VIII-VIII in FIG. 1.
Figure 9:
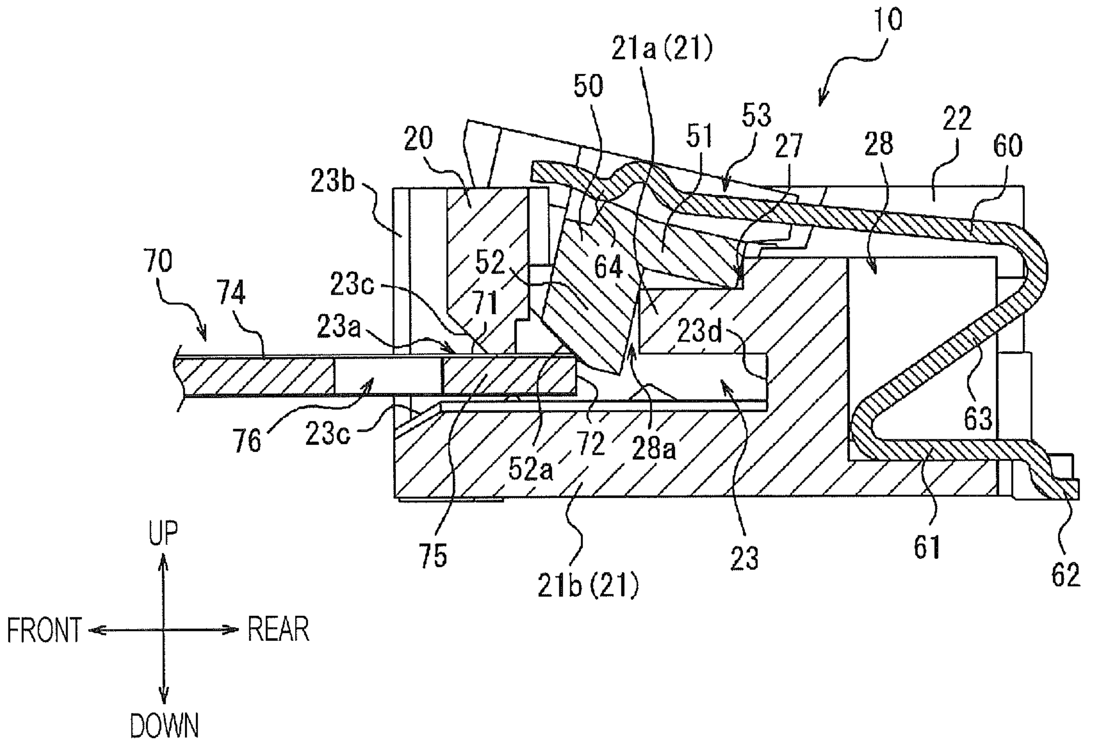
FIG. 9 is a cross-sectional view taken along arrow line IX-IX in FIG. 4.
Figure 10:
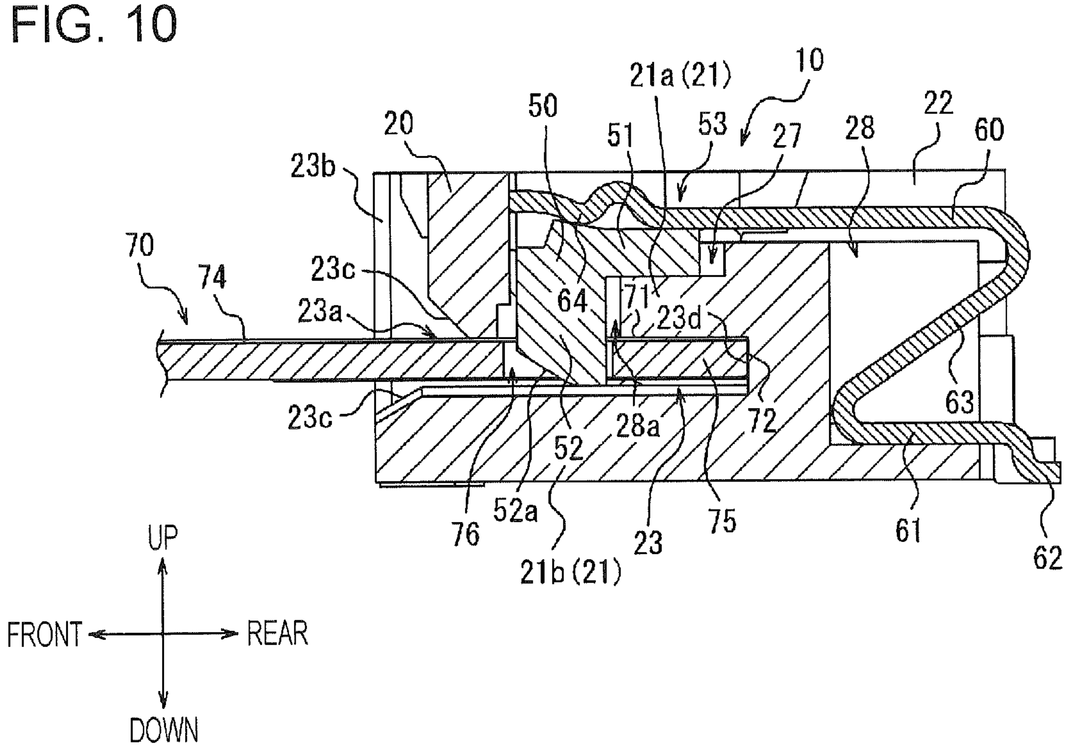
FIG. 10 is a cross-sectional view taken along arrow line X-X in FIG. 5.

Functions of the connector 10 according to the embodiment will now be mainly described with reference to FIGS. 8 to 22. FIG. 8 is a cross-sectional view taken along arrow line VIII-VIII in FIG. 1. FIG. 9 is a cross-sectional view taken along arrow line IX-IX in FIG. 4. FIG. 10 is a cross-sectional view taken along arrow line X-X in FIG. 5. FIGS. 8 to 10 illustrate sections of the configuration related to the locking protrusion 52 of the actuator 50 and the pressing member 60.

As illustrated in FIG. 8, while the actuator 50 is in the closed position in the non-insertion state, a lower face of the contact portion 64 of the pressing member 60 contacts the bottom of the hollow 53 of the actuator 50. At this time, the base portion 63 of the pressing member 60 is not resiliently deformed or is slightly resiliently deformed. A part of the base portion 51 of the actuator 50 that is located at the rear of the locking protrusion 52 contacts the outer surface of the top wall 21*a* of the insulator 20. The locking protrusion 52 of the actuator 50 protrudes in the insertion portion 23 through the through-hole 28*a* of the insulator 20.

When the connection object 70 is inserted into the insertion portion 23 of the connector 10, for example, one end of the connection object 70 enters the insertion portion 23 along the first angled face 23*b* and the second angled face 23*c* of the insulator 20. If the connection object 70 to be inserted is slightly skewed relative to the left-right direction of the insertion portion 23, the guide 77 of the connection object 70 can slide on the first angled face 23*b* of the insulator 20, so that the connection object 70 can be guided into the insertion portion 23. Similarly, if the connection object 70 to be inserted is slightly skewed relative to the up-down direction of the insertion portion 23, the end of the connection object 70 can slide on the second angled face 23*c* of the insulator 20, so that the connection object 70 can be guided into the insertion portion 23.

As illustrated in FIG. 9, when the connection object 70 moves further inward in the insertion portion 23, the retainer 75 of the connection object 70 contacts the locking protrusion 52 of the actuator 50. At this time, the contact between the connection object 70 and the sloped face 52*a*, located on the removal side, of the locking protrusion 52 produces a reaction force toward the open position of the actuator 50. Therefore, a moment of force toward the open position acts on the actuator 50.

When the connection object 70 moves further inward in the insertion portion 23 while the locking protrusion 52 is in contact with the retainer 75, the moment of force toward the open position causes the actuator 50 to rotate to the open position. The rotation of the actuator 50 to the open position increases the amount of resilient deformation of the base portion 63 of the pressing member 60. This increases an urging force of the contact portion 64 of the pressing member 60 that acts on the actuator 50 toward the closed position. At this time, the locking protrusion 52 of the actuator 50 rides on an upper face of the retainer 75 of the connection object 70. As the connection object 70 moves rearward, the retainer 75 slides relative to the tip of the locking protrusion 52.

As illustrated in FIG. 10, in the fully inserted state, the retainer 75 of the connection object 70 is held in the insertion portion 23 past the locking protrusion 52 of the actuator 50. For example, the end face 72 of the connection object 70 is against the inner face 23*d* of the insertion portion 23 of the insulator 20. At this time, the locking protrusion 52 is not in contact with the retainer 75 in the up-down direction, so that the actuator 50 automatically rotates to the closed position due to the urging force from the pressing member 60. In such a closed position of the actuator 50, the locking protrusion 52 engages with the lock recess 76 of the connection object 70. Thus, the actuator 50 retains the connection object 70 held in the insertion portion 23. If a user tries to forcedly remove the connection object 70 in such a state, the retainer 75 of the connection object 70 will contact the locking protrusion 52. Therefore, the connection object 70 can be more effectively retained.

As described above, the connector 10 retains the connection object 70 inserted by only one action of inserting the connection object 70 without the need for causing, for example, an operator or an assembly apparatus, to perform any operation on the actuator 50.

To remove the connection object 70 from the connector 10, for example, the operator or the assembly apparatus operates the operating portion 55 of the actuator 50 to maintain the actuator 50 in the open position. Thus, the locking protrusion 52 of the actuator 50 disengages from the lock recess 76 of the connection object 70. The engagement between the locking protrusion 52 and the lock recess 76 is released. Thus, the connection object 70 can be removed from the connector 10.

Figure 11:
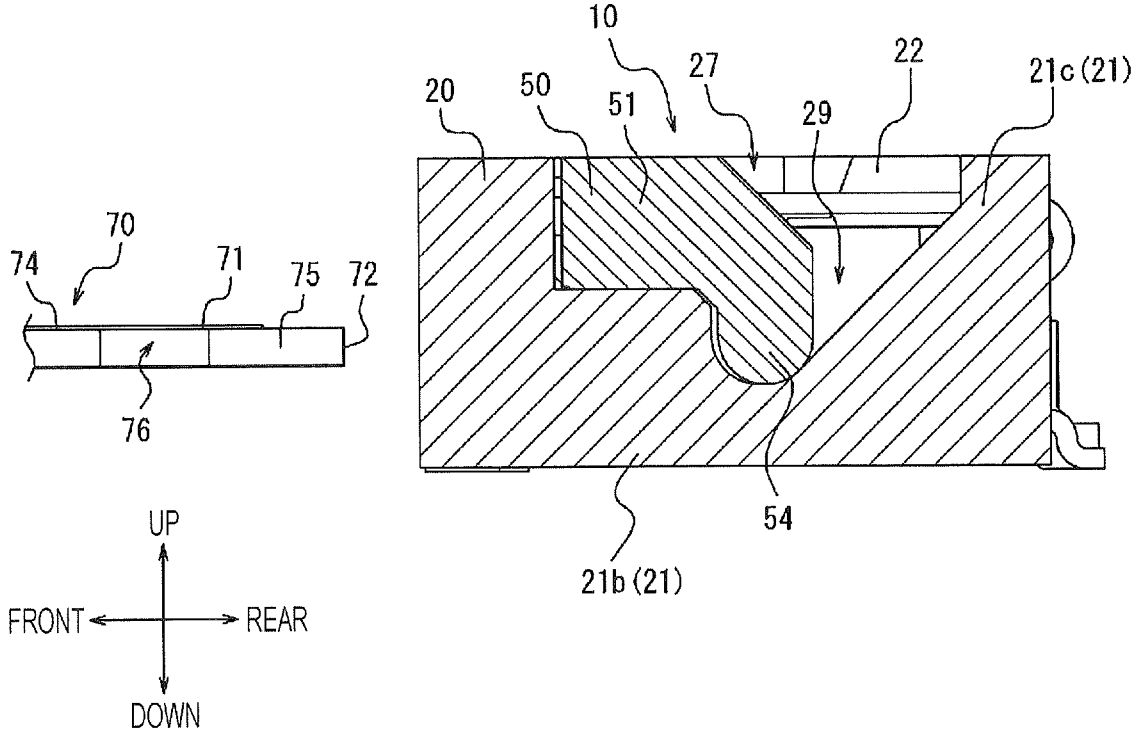
FIG. 11 is a cross-sectional view taken along arrow line XI-XI in FIG. 1.
Figure 12:
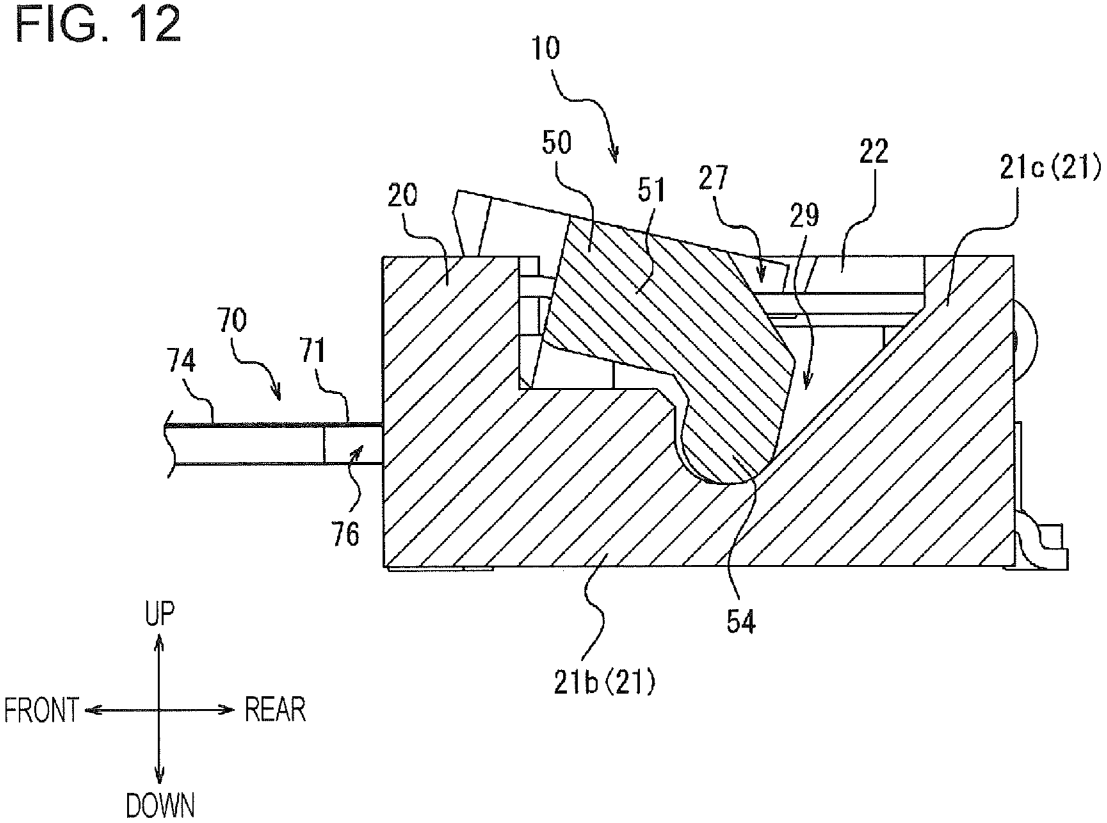
FIG. 12 is a cross-sectional view taken along arrow line XII-XII in FIG. 4.
Figure 13:
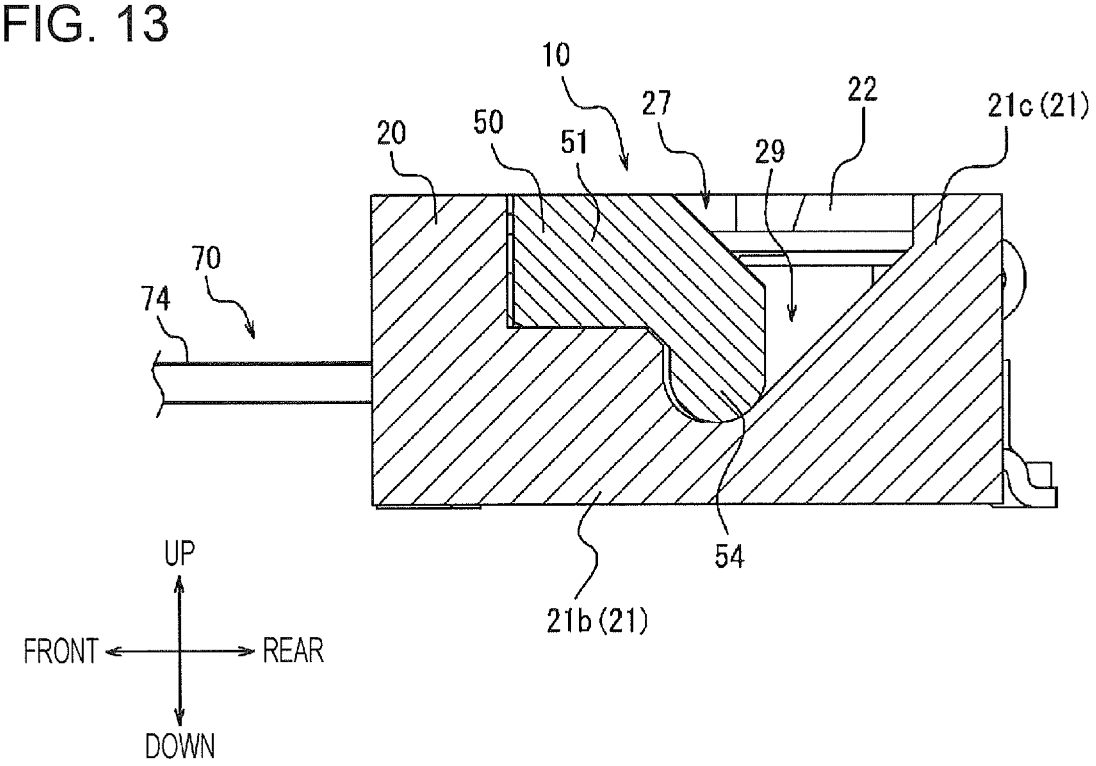
FIG. 13 is a cross-sectional view taken along arrow line XIII-XIII in FIG. 5.

FIG. 11 is a cross-sectional view taken along arrow line XI-XI in FIG. 1. FIG. 12 is a cross-sectional view taken along arrow line XII-XII in FIG. 4. FIG. 13 is a cross-sectional view taken along arrow line XIII-XIII in FIG. 5. FIGS. 11 to 13 illustrate sections of the configuration related to the pivot 54 of the actuator 50 and the receiving portion 29 of the insulator 20.

As illustrated in FIGS. 11 to 13, during transition from the non-insertion state to the partially inserted state and further to the fully inserted state, the actuator 50 shifts from the closed position to the open position and returns to the closed position. During this transition, the pivot 54 of the actuator 50 is held in the receiving portion 29 of the insulator 20 and is in contact with the inner face of the receiving portion 29 at all times. Such contact between the pivot 54 and the inner face of the receiving portion 29 causes the actuator 50 to be rotatable relative to the insulator 20. While the actuator 50 is in the closed position, a part of the base portion 51 of the actuator 50 that is located in front of the pivot 54 is in contact with the inner face of the receiving portion 29 of the insulator 20.

Figure 14:
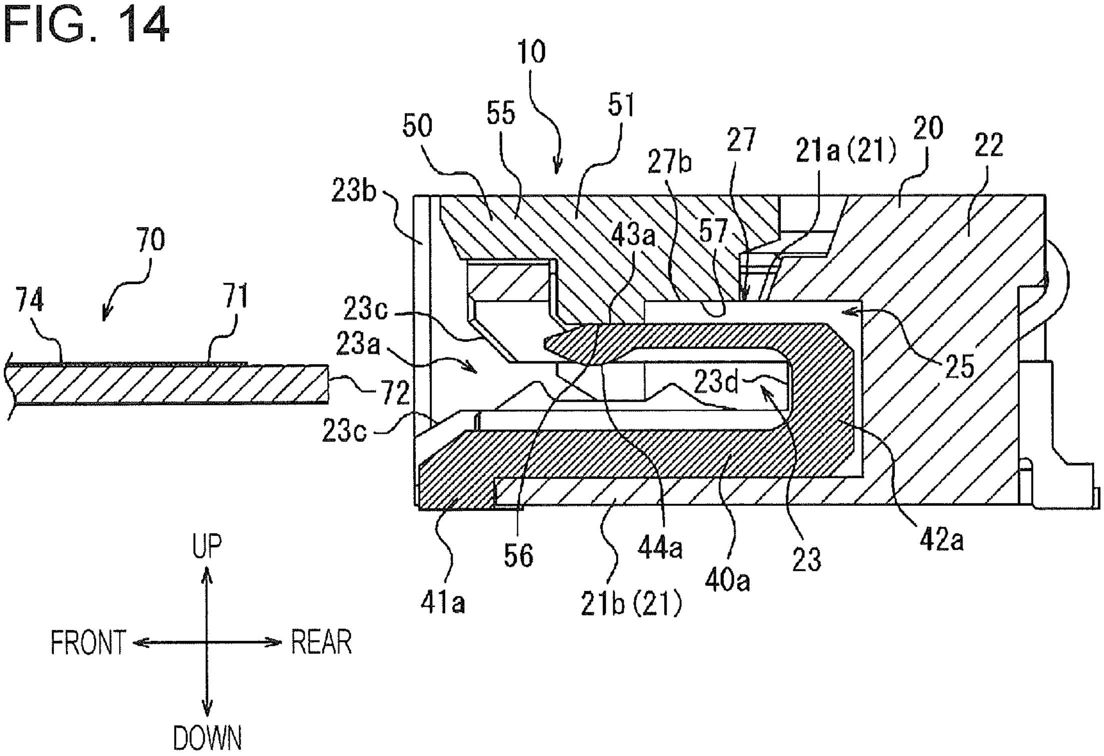
FIG. 14 is a cross-sectional view taken along arrow line XIV-XIV in FIG. 1.
Figure 15:
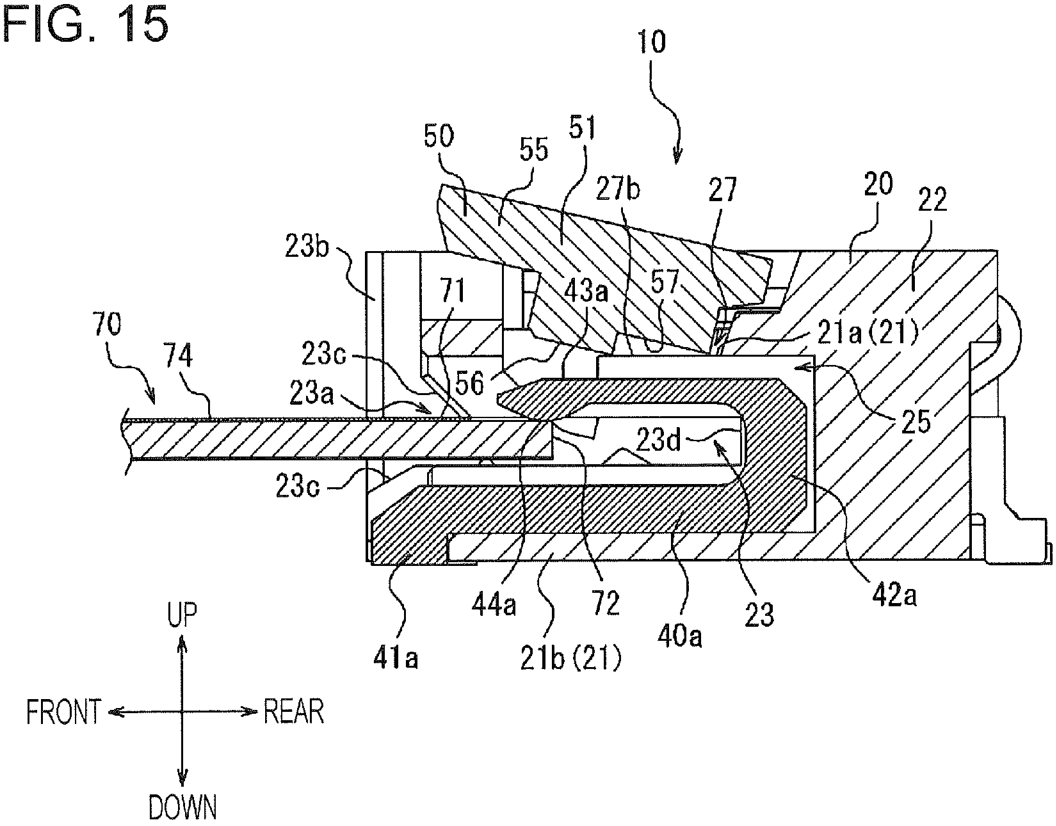
FIG. 15 is a cross-sectional view taken along arrow line XV-XV in FIG. 4.
Figure 16:
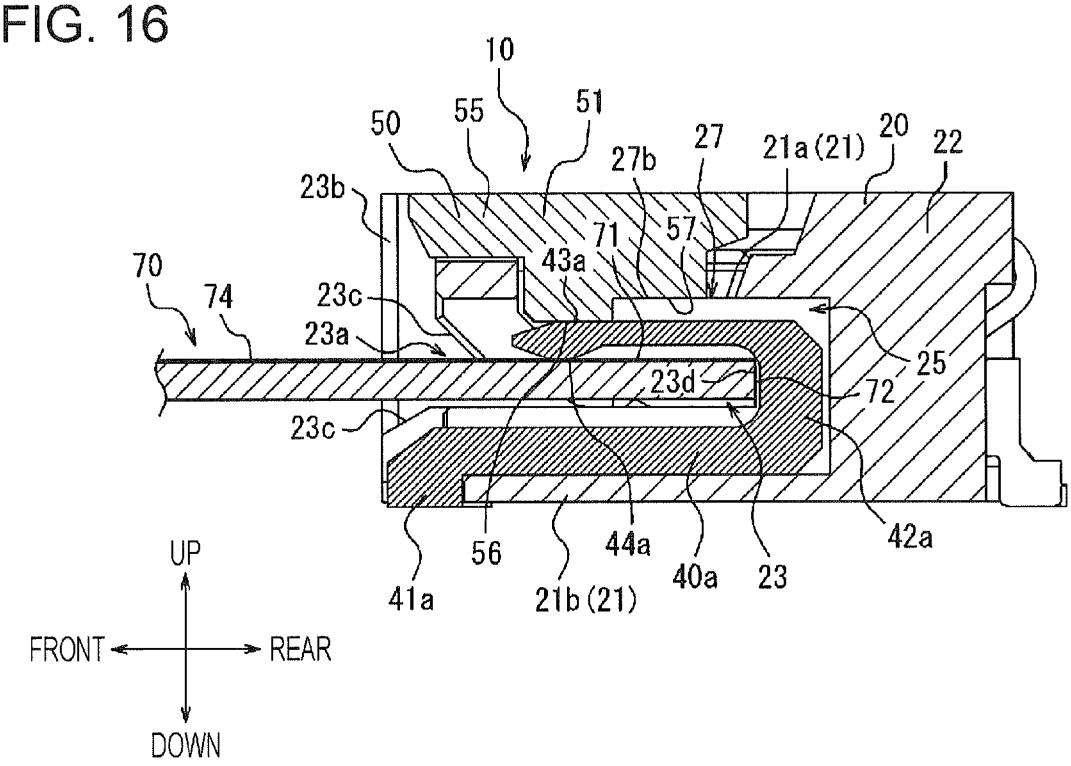
FIG. 16 is a cross-sectional view taken along arrow line XVI-XVI in FIG. 5.

FIG. 14 is a cross-sectional view taken along arrow line XIV-XIV in FIG. 1. FIG. 15 is a cross-sectional view taken along arrow line XV-XV in FIG. 4. FIG. 16 is a cross-sectional view taken along arrow line XVI-XVI in FIG. 5. FIGS. 14 to 16 illustrate sections of the configuration related to the first and second support portions 56 and 57 of the actuator 50 and the second contact 40*a*.

As illustrated in FIGS. 14 and 16, while the actuator 50 is in the closed position in each of the non-insertion state and the fully inserted state, the first support portion 56 of the actuator 50 contacts the supporting face 43*a* of the second contact 40*a*. The second contact 40*a* is mounted on the insulator 20. The supporting face 43*a* of the second contact 40*a* is exposed in the mounting portion 27 through the second-contact mounting groove 25. The second support portion 57 of the actuator 50 contacts the bottom 27*b* of the mounting portion 27 of the insulator 20.

As illustrated in FIG. 16, in the fully inserted state, the contact portion 44*a* of the second contact 40*a* contacts the outer cover 74 of the connection object 70. The actuator 50 and the second contact 40*a*, which are in contact with each other at the first support portion 56 and the supporting face 43*a*, downwardly press the connection object 70 in response to the contact between the contact portion 44*a* and the outer cover 74.

Figure 18:
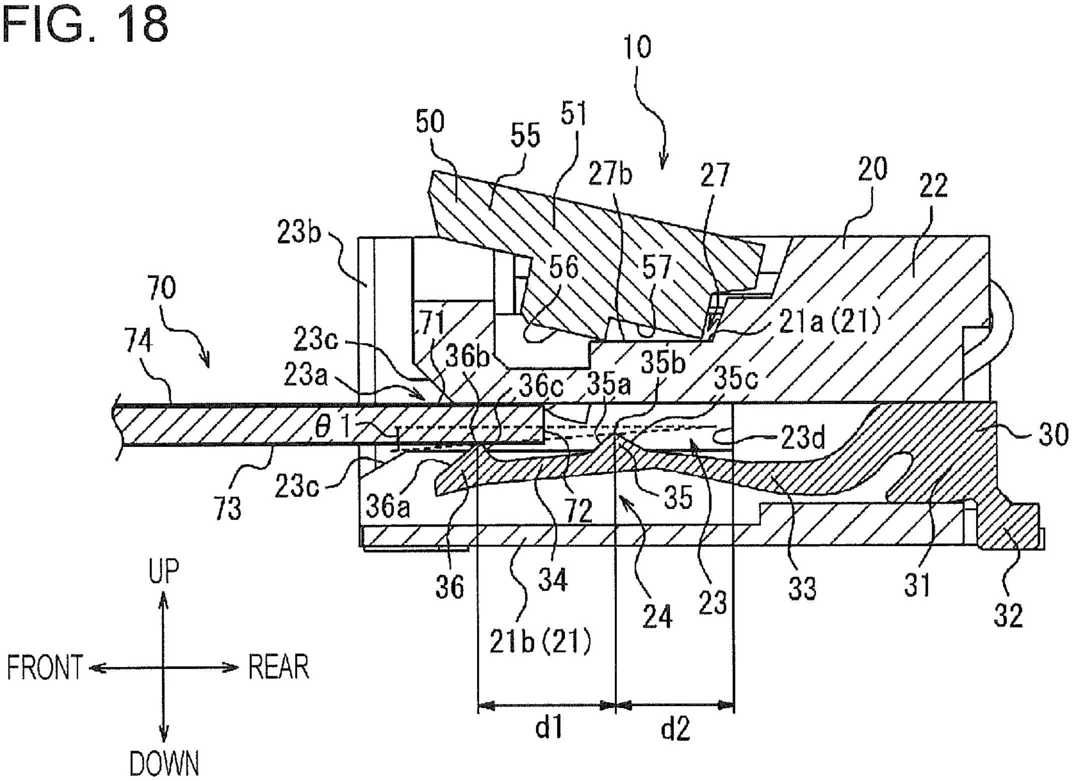
FIG. 18 is a cross-sectional view taken along arrow line XVIII-XVIII in FIG. 4.

FIG. 17 is a cross-sectional view taken along arrow line XVII-XVII in FIG. 1. FIG. 18 is a cross-sectional view taken along arrow line XVIII-XVIII in FIG. 4. FIG. 19 is a cross-sectional view taken along arrow line XIX-XIX in FIG. 5. FIGS. 17 to 19 illustrate sections of the configuration related to the first contact 30.

As illustrated in FIG. 17, after the first contact 30 is mounted in the first-contact mounting groove 24, the contact piece 34 is partly exposed in the insertion portion 23. For example, in the non-insertion state, the contact portion 35 and the removing portion 36 of the contact piece 34 are exposed in the insertion portion 23. At this time, the contact piece 34 is maintained while extending substantially horizontally from the resilient portion 33. A straight line connecting the apex part 35*b* of the contact portion 35 and the apex part 36*b* of the removing portion 36 extends substantially horizontally. The resilient portion 33 of the first contact 30 can be resiliently deformed downward in the first-contact mounting groove 24.

As illustrated in FIG. 18, the removing portion 36 contacts the signal line 73 of the connection object 70 in the partially inserted state, where the connection object 70 is inserted into the insertion portion 23. For example, the apex part 36*b* of the removing portion 36 contacts the signal line 73. At this time, the contact portion 35 is not in contact with the connection object 70. In the partially inserted state, the apex part 36*b* of the removing portion 36 in contact with the signal line 73 and the contact portion 35 are exposed in the insertion portion 23.

More specifically, when the connection object 70 moves inward in the insertion portion 23 in the non-insertion state, the end of the connection object 70 contacts the first sloped face 36*a* of the removing portion 36. At this time, the contact between the connection object 70 and the first sloped face 36*a* of the first contact 30 produces a reaction force that causes the resilient portion 33 of the first contact 30 to be resiliently deformed downward. Therefore, as the connection object 70 moves inward in the insertion portion 23, or as the connection object 70 moves in the insertion direction in which the connection object 70 is inserted into the insertion portion 23, the resilient portion 33 of the first contact 30 is resiliently deformed downward, so that the apex part 36*b* of the removing portion 36 comes into contact with the signal line 73.

When the connection object 70 moves further inward in the insertion portion 23, the signal line 73 slides relative to the apex part 36*b* of the removing portion 36. For a period of time between when the apex part 36*b* of the removing portion 36 contacts the signal line 73 and when the end of the connection object 70 contacts the first sloped face 35*a* of the contact portion 35, the contact piece 34 is maintained while being inclined obliquely downward from the resilient portion 33 toward the insertion opening 23*a* at a first angle θ1. The straight line connecting the apex part 35*b* of the contact portion 35 and the apex part 36*b* of the removing portion 36 is inclined obliquely downward and forward at the first angle θ1 relative to the horizontal direction.

At this time, the apex part 35*b* of the contact portion 35 is located closer to the connection object 70 than the apex part 36*b* of the removing portion 36 in the direction in which the contact portion 35 protrudes from the contact piece 34. For example, the apex part 35*b* of the contact portion 35 is located at a level higher than the apex part 36*b* of the removing portion 36. The apex part 35*b* of the contact portion 35 is located above the apex part 36*b* of the removing portion 36.

As illustrated in FIG. 19, the contact portion 35 contacts the signal line 73 of the connection object 70 in the fully inserted state, where the connection object 70 is held in the insertion portion 23. For example, the apex part 35*b* of the contact portion 35 contacts the signal line 73. In the fully inserted state, the resilient portion 33 is resiliently deformed downward by a larger amount than that in the partially inserted state, and the removing portion 36 is thus apart from the connection object 70. The removing portion 36 is not in contact with the connection object 70. In the fully inserted state, only the apex part 35*b* of the contact portion 35 in contact with the signal line 73 is exposed in the insertion portion 23.

More specifically, when the connection object 70 moves further inward in the insertion portion 23 in the partially inserted state, the end of the connection object 70 contacts the first sloped face 35*a* of the contact portion 35. At this time, the contact between the connection object 70 and the first sloped face 35*a* of the first contact 30 produces a reaction force that causes the resilient portion 33 of the first contact 30 to be further resiliently deformed downward. Therefore, as the connection object 70 moves inward in the insertion portion 23, the resilient portion 33 of the first contact 30 is further resiliently deformed downward, so that the apex part 36*b* of the removing portion 36 is further away from the signal line 73. In contrast, the apex part 35*b* of the contact portion 35 contacts the signal line 73.

While the connection object 70 moves further inward in the insertion portion 23 until the end face 72 comes into contact with the inner face 23*d* of the insertion portion 23, the signal line 73 slides relative to the apex part 35*b* of the contact portion 35. Once the apex part 35*b* of the contact portion 35 contacts the signal line 73, the contact piece 34 is maintained while being inclined obliquely downward from the resilient portion 33 toward the insertion opening 23*a* at a second angle θ2. The straight line connecting the apex part 35*b* of the contact portion 35 and the apex part 36*b* of the removing portion 36 is inclined obliquely downward and forward at the second angle θ2 relative to the horizontal direction. After the end face 72 of the connection object 70 comes into contact with the inner face 23*d*, or after the connection object 70 completely enters the fully inserted state, the contact piece 34 is maintained at the second angle θ2. The second angle θ2 in the fully inserted state is larger than the first angle θ1 in the partially inserted state.

As illustrated in FIG. 18, a distance d1 between a first point of contact between the removing portion 36 and the signal line 73 in the partially inserted state and a second point of contact between the contact portion 35 and the signal line 73 in the fully inserted state in the insertion direction is larger than a distance d2 between the second point of contact and the inner face 23*d* in the insertion direction.

Figure 20:
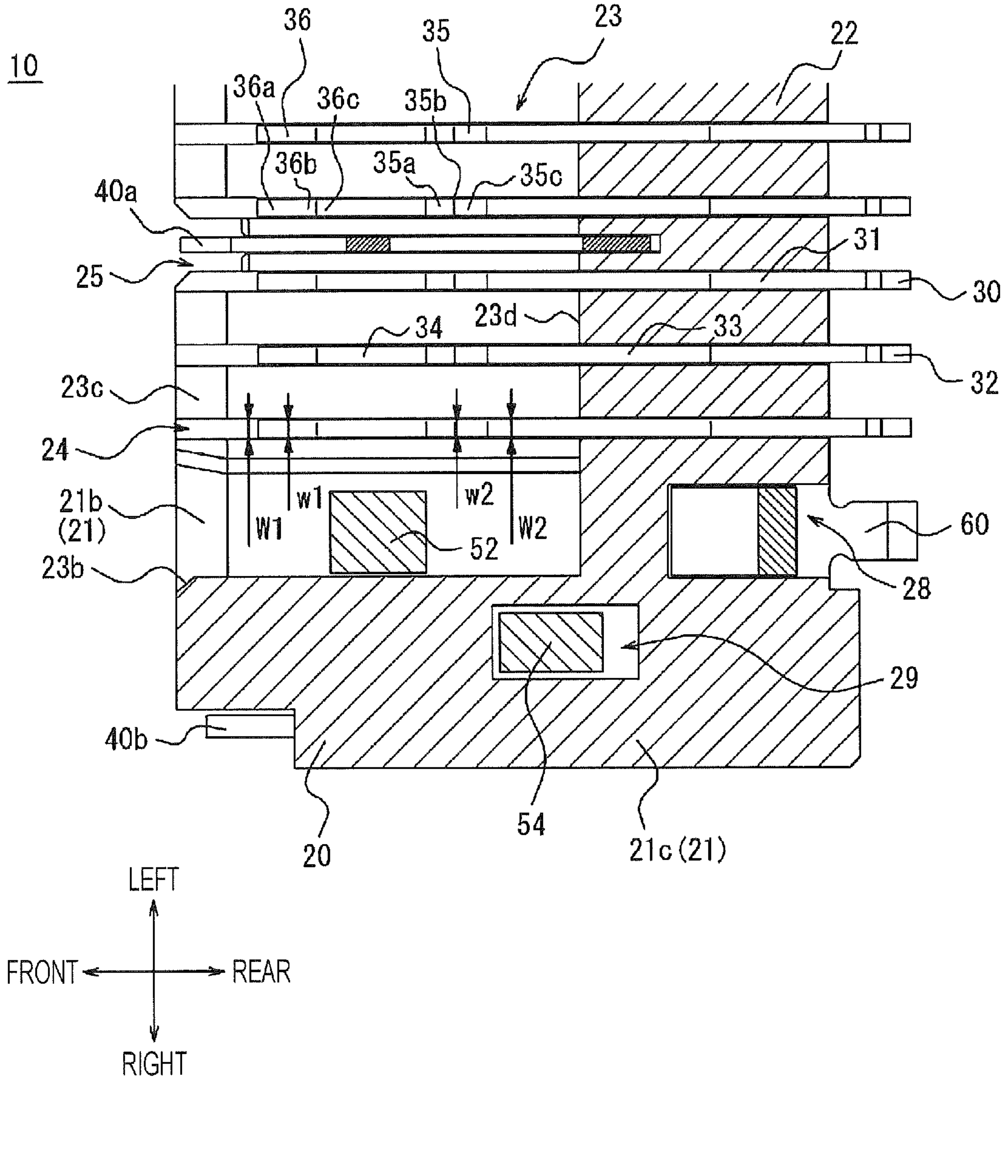
FIG. 20 is an enlarged sectional view taken along arrow line XX-XX in FIG. 1.

FIG. 20 is an enlarged sectional view taken along arrow line XX-XX in FIG. 1. FIG. 20 illustrates the first-contact mounting groove 24, in which the first contact 30 is mounted, of the insulator 20 as viewed from above. For example, the first-contact mounting groove 24 has a width in the direction orthogonal to the direction in which the contact portion 35 protrudes from the contact piece 34 and orthogonal to the insertion direction in which the connection object 70 is inserted, and the width is uniform in the front-rear direction. A width W1 at the removing portion 36 and a width W2 at the contact portion 35 are equal to each other. For example, the width W1 and the width W2 may be slightly larger than the thickness of the first contact 30.

A width w1 of the removing portion 36 in the direction orthogonal to the direction in which the contact portion 35 protrudes from the contact piece 34 and orthogonal to the insertion direction in which the connection object 70 is inserted is larger than or equal to a width w2 of the contact portion 35 in that direction. FIG. 20 illustrates an example in which the width w1 is equal to the width w2.

When the first contact 30 is viewed from above, the removing portion 36 is aligned with at least part of the contact portion 35 in the direction orthogonal to the direction in which the contact portion 35 protrudes from the contact piece 34 and orthogonal to the insertion direction in which the connection object 70 is inserted. For example, the contact portion 35 is superimposed on the removing portion 36 on a straight line such that the straight line connecting the contact portion 35 and the removing portion 36 is substantially parallel to the insertion direction. The contact portion 35 and the removing portion 36 are located on the same straight line substantially parallel to the insertion direction in which the connection object 70 is inserted.

The following description will mainly focus on the connector 10. Advantages of the connector 10 will be described below. The same and/or similar description applies to an electronic device including the connector 10.

The connector 10 according to the above-described embodiment achieves compatibility between improvement of reliability and improvement of signal transmission characteristics. For example, the connector 10 according to the embodiment achieves compatibility between removal of foreign matter on the connection object 70 and improvement of signal transmission characteristics. For example, in the partially inserted state where the connection object 70 is inserted into the insertion portion 23, the removing portion 36 contacts the signal line 73 of the connection object 70. Thus, the foreign matter on the signal line 73 of the connection object 70 can be removed. More specifically, the foreign matter adheres to the removing portion 36 of the first contact 30 in the partially inserted state, and is then removed from the signal line 73 of the connection object 70 since the removing portion 36 is apart from the signal line 73 in the fully inserted state. In the partially inserted state, the signal line 73 of the connection object 70 slides relative to the apex part 36*b* of the removing portion 36. Thus, the foreign matter is removed in a predetermined region of the signal line 73 of the connection object 70 in the insertion direction.

In addition, resilient deformation of the resilient portion 33 in the fully inserted state causes the removing portion 36 to be away from the connection object 70. The signal line 73 of the connection object 70 contacts only the contact portion 35 of the first contact 30 in the fully inserted state. Such contact at a single point between the first contact 30 and the signal line 73 can reduce a current loop flowing through the first contact 30 and the signal line 73. If not only the contact portion 35 of the first contact 30 but also the removing portion 36 were in contact with the signal line 73 in the fully inserted state as in the related art, current might loop at two contact points. The connector 10 according to the embodiment can reduce such a current loop, leading to improved signal transmission characteristics.

In the partially inserted state, the apex part 35*b* of the contact portion 35 is located closer to the connection object 70 than the apex part 36*b* of the removing portion 36 in the direction in which the contact portion 35 protrudes from the contact piece 34. This allows the signal line 73 of the connection object 70 to readily contact the apex part 35*b* when the connection object 70 is moved further inward in the insertion portion 23 and enters the fully inserted state. In addition, this allows the removing portion 36 to be readily away from the connection object 70, thus more reliably ensuring the above-described effect of improving the signal transmission characteristics.

The removing portion 36 is superimposed on at least a part of the contact portion 35 in the direction orthogonal to the direction in which the contact portion 35 protrudes from the contact piece 34 and orthogonal to the insertion direction in which the connection object 70 is inserted. This ensures that, after the foreign matter on the signal line 73 of the connection object 70 is removed by the removing portion 36, a foreign-matter-free face of the signal line 73 that is subjected to foreign matter removal is brought into contact with the contact portion 35 of the first contact 30.

The width w1 of the removing portion 36 in the direction orthogonal to the direction in which the contact portion 35 protrudes from the contact piece 34 and orthogonal to the insertion direction in which the connection object 70 is inserted is larger than or equal to the width w2 of the contact portion 35 in that direction. This ensures that, after the foreign matter on the signal line 73 of the connection object 70 is removed by the removing portion 36, the foreign-matter-free face of the signal line 73 is brought into contact with the contact portion 35 of the first contact 30.

The contact piece 34 extends toward the insertion opening 23*a* of the insertion portion 23 while being angled relative to the resilient portion 33 in the direction opposite to the direction in which the contact portion 35 protrudes from the contact piece 34. This allows separation of the removing portion 36 from the signal line 73 and contact at a single point between the contact portion 35 and the signal line 73 in the fully inserted state. In the first contact 30, the removing portion 36 is apart from and in front of the resilient portion 33 and the contact portion 35, and is located at an end of the first contact 30 that is adjacent to the insertion opening 23*a*. This keeps the removing portion 36 from applying an excessive pressure to the connection object 70 in the partially inserted state. The removing portion 36 at the front end of the contact piece 34 contacts the signal line 73 of the connection object 70. This allows the first contact 30 to apply a minimum pressure, which is needed to remove foreign matter on the signal line 73 of the connection object 70, to the connection object 70. This reduces breakage of the connection object 70 during insertion of the connection object 70 into the insertion portion 23. The rounded apex part 36*b* of the removing portion 36 significantly increases the effect of reducing such breakage.

In contrast, the contact portion 35 located next to the resilient portion 33 in the first contact 30 can provide pressure that is necessary for the first contact 30 in the fully inserted state to press the connection object 70 from below. The connector 10 can hold the connection object 70 with such pressure applied from below by the first contact 30 and pressure applied from above by the pressing member 60, the actuator 50, and the second contact 40*a*, As described above, the connector 10 can stably hold the connection object 70 with sufficient holding power even in use in an environment with high vibration, for example, in electronic devices including industrial equipment and on-vehicle equipment. The rounded apex part 35*b* of the contact portion 35 reduces breakage of the connection object 70 in the fully inserted state.

The insertion portion 23 includes the inner face 23*d*, serving as a reference to position the end face 72 of the connection object 70 in the insertion direction in the fully inserted state. This facilitates positioning of the connection object 70 relative to the connector 10 in the front-rear direction. This improves the workability of insertion of the connection object 70 into the insertion portion 23.

The distance d1 is larger than the distance d2 in the insertion direction. This ensures that the foreign-matter-free face, from which foreign matter is removed by the removing portion 36, of the signal line 73 of the connection object 70 is brought into contact with the contact portion 35 of the first contact 30. This reduces corrosion that is caused by contact between the contact portion 35 and the signal line 73 with foreign matter and that results from the difference in ionization tendency therebetween. More specifically, foreign matter adheres to the removing portion 36 and separates from the signal line 73 of the connection object 70, resulting in reduction of the foreign matter between the signal line 73 and the contact portion 35. Therefore, the above-described corrosion can be reduced.

It will be apparent to those skilled in the art that the present disclosure can be implemented in other specific forms in addition to the above-described embodiment without departing from the spirit or essential characteristics thereof. Therefore, the above description is illustrative and is not restrictive. The scope of the present disclosure is defined by the appended claims, rather than the foregoing description. Some variations that are within the range of equivalents of all variations are intended to be encompassed within the scope of the present disclosure.

For example, the shape, arrangement, orientation, number, and the like of the components described above are not limited to those illustrated in the above description and the figures. Any shape, arrangement, orientation, number, and the like of the components that realize the functions thereof may be used.

The above-described method of assembling the connector 10 is not limited to details in the above description. The connector 10 may be assembled in any manner that allows the functions to be achieved. For example, at least one selected from the group consisting of the first contact 30, the second contact 40*a*, the fitting 40*b*, and the pressing member 60 may be formed integrally with the insulator 20 by insert molding, rather than press fitting.

In the above-described embodiment, the apex part 35*b* of the contact portion 35 has a rounded shape. The configuration is not limited to this example. The apex part 35*b* may have any shape. For example, the apex part 35*b* may have a sharp-edged shape. Similarly, in the above-described embodiment, the apex part 36*b* of the removing portion 36 has a rounded shape. The configuration is not limited to this example. The apex part 36*b* may have any shape. For example, the apex part 36*b* may have a sharp-edged shape.

In the above-described embodiment, the resilient portion 33 and the contact piece 34 of the first contact 30 are arranged below the insertion portion 23 and the connection object 70, and the contact piece 34 is inclined downward as the resilient portion 33 is resiliently deformed downward. The configuration is not limited to this example. For example, the resilient portion 33 and the contact piece 34 of the first contact 30 may be arranged above the insertion portion 23 and the connection object 70. The contact piece 34 may be inclined upward as the resilient portion 33 is resiliently deformed upward.

In the above-described embodiment, the contact piece 34 extends toward the insertion opening 23*a* of the insertion portion 23 while being angled relative to the resilient portion 33. The configuration is not limited to this example. The contact piece 34 may connect to the resilient portion 33 with any structure that achieves contact between the removing portion 36 and the signal line 73 in the partially inserted state, separation of the removing portion 36 from the signal line 73 in the fully inserted state, and contact between the contact portion 35 and the signal line 73 in the fully inserted state. For example, the contact piece 34 does not necessarily need to be at an obtuse angle to the front end of the resilient portion 33. For example, the contact piece 34 does not necessarily need to be angled relative to the resilient portion 33. For example, the contact piece 34 may be part of the resilient portion 33.

In the above-described embodiment, the width w1 of the removing portion 36 is larger than or equal to the width w2 of the contact portion 35. The configuration is not limited to this example. The width w1 may be smaller than the width w2.

In the above-described embodiment, in the non-insertion state, the straight line connecting the apex part 35*b* of the contact portion 35 and the apex part 36*b* of the removing portion 36 extends substantially horizontally. The configuration is not limited to this example. The straight line connecting the apex part 35*b* of the contact portion 35 and the apex part 36*b* of the removing portion 36 does not necessarily need to extend substantially horizontally.

In the above-described embodiment, in the partially inserted state, the straight line connecting the apex part 35*b* of the contact portion 35 and the apex part 36*b* of the removing portion 36 is inclined obliquely downward. The configuration is not limited to this example. The straight line connecting the apex part 35*b* of the contact portion 35 and the apex part 36*b* of the removing portion 36 does not necessarily need to be inclined.

In the above-described embodiment, the removing portion 36, the contact portion 35, and the resilient portion 33 are arranged in that order from the insertion-opening-23*a* side. The configuration is not limited to this example. The first contact 30 may include any structure that achieves contact between the removing portion 36 and the signal line 73 in the partially inserted state, separation of the removing portion 36 from the signal line 73 in the fully inserted state, and contact between the contact portion 35 and the signal line 73 in the fully inserted state. For example, the resilient portion

33, the removing portion 36, and the contact portion 35 may be arranged in that order from the insertion-opening-23*a* side. For example, the removing portion 36, the resilient portion 33, and the contact portion 35 may be arranged in that order from the insertion-opening-23*a* side.

In the above-described embodiment, the insertion portion 23 includes the inner face 23*d*, serving as a reference to position the end face 72 of the connection object 70 in the insertion direction in the fully inserted state. The configuration is not limited to this example. The insertion portion 23 may include no inner face 23*d*. In this case, the insulator 20 may include any structure to position, for example, opposite ends of the connection object 70 in the left-right direction, in the insertion direction.

In the above-described embodiment, the distance d1 is larger than the distance d2 in the insertion direction. The configuration is not limited to this example. The distance d1 may be smaller than the distance d2 in the insertion direction.

In the above-described embodiment, the actuator 50 of the connector 10 can be operated by only one action of inserting the connection object 70. The configuration is not limited to this example. The connector 10 may need any direct operation on the actuator 50 that is performed by, for example, the operator or the assembly apparatus, or may include no actuator 50.

Figure 21:
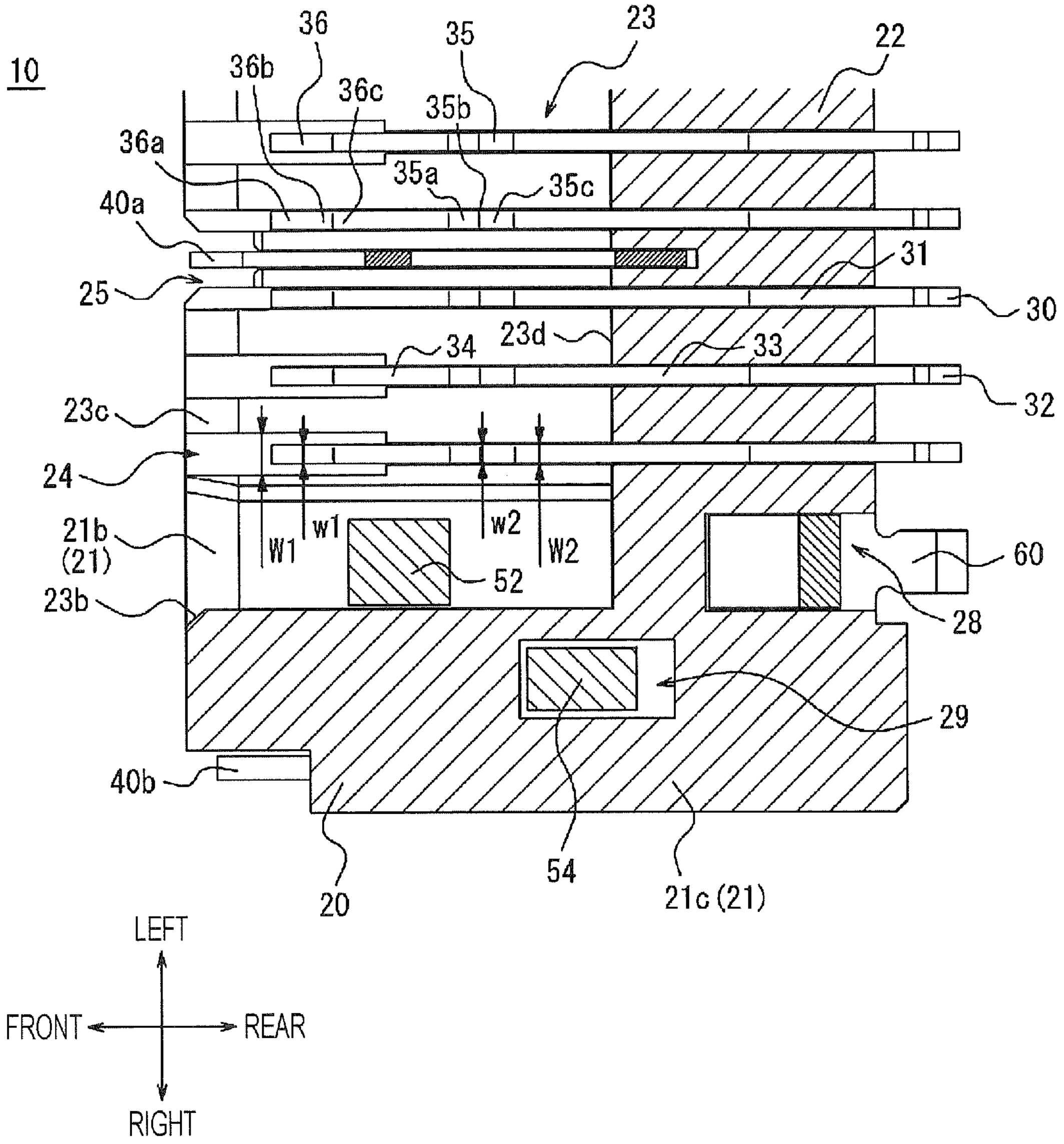
FIG. 21 is an enlarged sectional view, which is equivalent to FIG. 20, of a first variation of the connector in FIG. 1.

FIG. 21 is an enlarged sectional view, which is equivalent to FIG. 20, of a first variation of the connector 10 in FIG. 1. In the foregoing embodiment, the width W1 at the removing portion 36 is equal to the width W2 at the contact portion 35. The configuration is not limited to this example. For the width of the first-contact mounting groove 24 in the direction orthogonal to the direction in which the contact portion 35 protrudes from the contact piece 34 and orthogonal to the insertion direction in which the connection object 70 is inserted, as illustrated in FIG. 21, the width thereof may be large at the removing portion 36, and may be small at the contact portion 35. The width W2 may be smaller than the width W1. Such a configuration facilitates removal of foreign matter on the connection object 70 at the removing portion 36 and keeps the foreign matter on the connection object 70 from entering the first-contact mounting groove 24 at the contact portion 35 of the first contact 30.

The width of the first-contact mounting groove 24 in the direction orthogonal to the direction in which the contact portion 35 protrudes from the contact piece 34 and orthogonal to the insertion direction in which the connection object 70 is inserted may change in a stepwise manner in a region between the removing portion 36 and the contact portion 35. As described above, the width of the first-contact mounting groove 24 in the direction orthogonal to the direction in which the contact portion 35 protrudes from the contact piece 34 and orthogonal to the insertion direction, in which the connection object 70 is inserted, changes sharply in the region between the removing portion 36 and the contact portion 35. This significantly increases the above-described effect of keeping the foreign matter from entering the first-contact mounting groove 24 at the contact portion 35 of the first contact 30.

The manner of change of the width of the first-contact mounting groove 24 in the direction orthogonal to the direction in which the contact portion 35 protrudes from the contact piece 34 and orthogonal to the insertion direction in which the connection object 70 is inserted is not limited to the stepwise manner. The width of the first-contact mounting groove 24 may change in any manner in the region between the removing portion 36 and the contact portion 35. For example, the width of the first-contact mounting groove 24 in the direction orthogonal to the direction in which the contact portion 35 protrudes from the contact piece 34 and orthogonal to the insertion direction in which the connection object 70 is inserted may continuously decrease from the width W1 to the width W2 in the region between the removing portion 36 and the contact portion 35.

Figure 22:
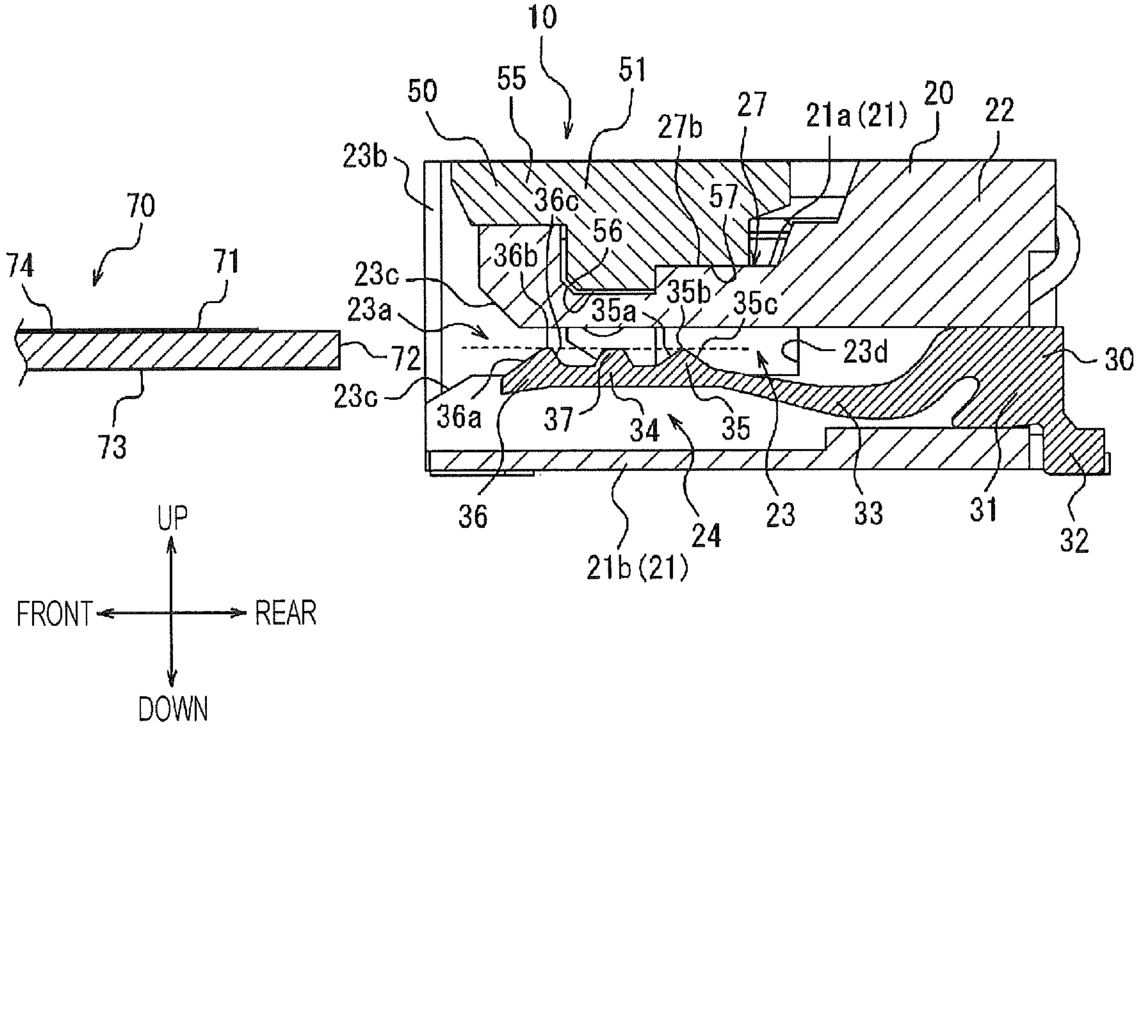
FIG. 22 is a cross-sectional view, which is equivalent to FIG. 17, of a second variation of the connector in FIG. 1.

FIG. 22 is a cross-sectional view, which is equivalent to FIG. 17, of a second variation of the connector 10 in FIG. 1. In the above-described embodiment, the contact piece 34 includes protrusions only at the contact portion 35 and the removing portion 36. The configuration is not limited to this example. The contact piece 34 may further include a protrusion 37, which is located between the removing portion 36 and the contact portion 35 and protrudes in the same direction as that in which the removing portion 36 and the contact portion 35 protrude. In such a configuration, only the contact portion 35 contacts the signal line 73 of the connection object 70 in the fully inserted state. This configuration enables removal of foreign matter on the connection object 70 at the removing portion 36 and keeps the foreign matter on the connection object 70 from adhering to the contact portion 35 of the first contact 30.

The above-described connector 10 is mounted on an electronic device. Examples of the electronic device include any on-vehicle equipment including a camera, a radar, a dashboard camera, and an engine control unit. Examples of the electronic device include any on-vehicle equipment used in on-vehicle systems, such as a car navigation system, an advanced driver assistance system, and a security system. Examples of the electronic device further include any industrial equipment. Examples of the electronic device are not limited to those described above. Examples of the electronic device may include any information equipment, such as a personal computer, a smartphone, a copier, a printer, a facsimile, and a multifunction machine. Examples of the electronic device may include any audio-visual equipment, such as a liquid crystal television set, a recorder, a camera, and a headphone.

Such an electronic device, serving as a product, has improved reliability due to the above-described advantages of the connector 10, or achieved compatibility between removal of foreign matter on the connection object 70 and improvement of signal transmission characteristics.

REFERENCE SIGNS

10 connector
20 insulator
21 outer peripheral wall
21*a* top wall
21*b* bottom wall
21*c* side wall
22 rear wall
23 insertion portion
23*a* insertion opening
23*b* first angled face
23*c* second angled face
23*d* inner face
24 first-contact mounting groove (mounting groove)
25 second-contact mounting groove
26 fitting mounting groove
27 mounting portion
27*a* rib
27*b* bottom
28 mounting groove
28*a* through-hole

29 receiving portion
30 first contact (contact)
31 engaging portion
32 installation portion
33 resilient portion
34 contact piece
35 contact portion
35*a* first sloped face
35*b* apex part
35*c* second sloped face
36 removing portion
36*a* first sloped face
36*b* apex part
36*c* second sloped face
37 protrusion
40*a* second contact
40*b* fitting
41*a* installation portion
41*b* installation portion
42*a* base portion
42*b* engaging portion
43*a* supporting face
44*a* contact portion
50 actuator
51 base portion
52 locking protrusion
52*a* sloped face
53 hollow
54 pivot
55 operating portion
56 first support portion
57 second support portion
58 groove
60 pressing member
61 engaging portion
62 installation portion
63 base portion
64 contact portion
70 connection object
71 end portion
72 end face
73 signal line
74 outer cover
75 retainer
76 lock recess
77 guide
CB circuit board
W1 width
W2 width
w1 width
w2 width
d1 distance
d2 distance
θ1 first angle
θ2 second angle

The invention claimed is:

1. A connector into and from which a connection object is insertable and removable, the connector comprising:
- an insulator comprising an insertion portion in which a connection object can be inserted; and
- a contact mounted on the insulator, wherein
- the contact comprises a contact piece and a resilient portion, the resilient portion being resiliently deformable,
- the contact piece comprises:
  - a contact portion configured to be connected to a signal line of the connection object in a fully inserted state in which the connection object is fully inserted in the insertion portion; and
  - a removing portion located closer to an insertion opening of the insertion portion than the contact portion to the insertion opening of the insertion portion, and
- the removing portion is configured to be connected to the signal line in a partially inserted state in which the connection object is partially inserted in the insertion portion, the removing portion configured to be apart from the connection object when the resilient portion is resiliently deformed in the fully inserted state.

2. The connector according to claim 1, wherein the contact portion comprises an apex part, the apex part configured to be located closer to the connection object than an apex part of the removing portion to the connection object in a direction in which the contact portion protrudes from the contact piece in the partially inserted state.

3. The connector according to claim 1, wherein the removing portion is superimposed on at least a part of the contact portion in a direction orthogonal to each of a direction in which the contact portion protrudes from the contact piece and an insertion direction in which the connection object is inserted.

4. The connector according to claim 1, wherein the removing portion has a width in an orthogonal direction orthogonal to each of a direction in which the contact portion protrudes from the contact piece and an insertion direction in which the connection object is inserted, and the width of the removing portion is larger than or equal to a width of the contact portion in the orthogonal direction.

5. The connector according to claim 1, wherein the contact piece protrudes toward the insertion opening of the insertion portion while being angled relative to the resilient portion in a direction opposite to a direction in which the contact portion protrudes from the contact piece.

6. The connector according to claim 1, wherein
- the contact comprises an engaging portion engaging with the insulator,
- the resilient portion extends obliquely downward from the engaging portion toward the insertion opening, bends, and extends obliquely upward, and
- the contact piece protrudes from an end of the resilient portion toward the insertion opening of the insertion portion, the contact piece bent at an obtuse angle to the resilient portion.

7. The connector according to claim 1, wherein the insertion portion comprises an inner face as a reference to position an end face of the connection object in an insertion direction in the fully inserted state.

8. The connector according to claim 7, wherein a distance in the insertion direction between a first point of contact between the removing portion and the signal line in the partially inserted state and a second point of contact between the contact portion and the signal line in the fully inserted state is larger than a distance in the insertion direction between the second point of contact and the inner face.

9. The connector according to claim 1,
- wherein the insulator comprises a mounting groove in which the contact is mounted, and
- wherein the mounting groove has a width in a direction orthogonal to each of a direction in which the contact portion protrudes from the contact piece and an insertion direction in which the connection object is inserted, and the width at a position in which the removing portion being located is larger than the width at a position in which the contact portion being located.

10. The connector according to claim 9, wherein the width changes in a stepwise manner in a region between the removing portion and the contact portion.

11. The connector according to claim 1, wherein the contact piece comprises a protrusion that is located between the removing portion and the contact portion and protrudes in a same direction as that in which the removing portion and the contact portion protrude.

12. An electronic device comprising the connector according to claim 1.

* * * * *